(12) United States Patent
Gofman

(10) Patent No.: US 10,880,326 B1
(45) Date of Patent: Dec. 29, 2020

(54) SYSTEMS AND METHODS FOR DETERMINING AN OPPORTUNITY FOR NODE POISONING IN A PENETRATION TESTING CAMPAIGN, BASED ON ACTUAL NETWORK TRAFFIC

(71) Applicant: XM Cyber Ltd., Herzelyia (IL)

(72) Inventor: Igal Gofman, Rosh-Haayin (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

(21) Appl. No.: 16/936,446

(22) Filed: Jul. 23, 2020

Related U.S. Application Data

(63) Continuation of application No. PCT/IB2020/056929, filed on Jul. 22, 2020.
(60) Provisional application No. 62/881,768, filed on Aug. 1, 2019.

(51) Int. Cl.
*H04L 29/06* (2006.01)
*G06Q 10/10* (2012.01)
*H04L 12/58* (2006.01)
*G06Q 10/06* (2012.01)
*H04L 29/12* (2006.01)

(52) U.S. Cl.
CPC ..... *H04L 63/1433* (2013.01); *G06Q 10/0635* (2013.01); *G06Q 10/107* (2013.01); *H04L 51/08* (2013.01); *H04L 63/1425* (2013.01); *H04L 61/307* (2013.01)

(58) Field of Classification Search
CPC ........ G06F 21/50; G06F 21/55; G06F 21/554; H04L 63/14; H04L 63/1416; H04L 63/1433; H04L 63/1441; H04L 63/145; H04L 63/20
See application file for complete search history.

(56) References Cited

U.S. PATENT DOCUMENTS

| | | | |
|---|---|---|---|
| 6,574,737 B1 | 6/2003 | Kingsford et al. |
| 6,711,127 B1 | 3/2004 | Gorman et al. |
| 6,918,038 B1 | 7/2005 | Smith et al. |
| 6,952,779 B1 | 10/2005 | Cohen et al. |
| 7,013,395 B1 | 3/2006 | Swiler et al. |
| 7,296,092 B2 | 11/2007 | Nguyen |
| 7,693,810 B2 | 4/2010 | Donoho et al. |
| 7,757,293 B2 | 7/2010 | Caceres et al. |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.

(Continued)

*Primary Examiner* — Edward Zee
(74) *Attorney, Agent, or Firm* — Marc Van Dyke; Momentum IP Group

(57) ABSTRACT

Methods and systems for carrying out a simulated penetration testing campaign of a networked system for identifying a specific way for an attacker to compromise a networked system, where the specific way includes a step of poisoning the specific network node by the specific network node receiving a poisoned email body, or a poisoned email attachment, which includes malicious code.

20 Claims, 9 Drawing Sheets

(56) References Cited

U.S. PATENT DOCUMENTS

| | | |
|---|---|---|
| 7,926,113 B1 | 4/2011 | Gula et al. |
| 7,934,254 B2 | 4/2011 | Graham |
| 7,966,659 B1 | 6/2011 | Wilkinson et al. |
| 8,001,589 B2 | 8/2011 | Ormazabal et al. |
| 8,112,016 B2 | 2/2012 | Matsumoto et al. |
| 8,127,359 B2 | 2/2012 | Kelekar |
| 8,321,944 B1 | 11/2012 | Mayer et al. |
| 8,356,353 B2 | 1/2013 | Futoransky et al. |
| 8,365,289 B2 | 1/2013 | Russ et al. |
| 8,392,997 B2 | 3/2013 | Chen et al. |
| 8,490,193 B2 | 7/2013 | Sarraute Yamada et al. |
| 8,490,196 B2 | 7/2013 | Lucangeli Obes et al. |
| 8,650,651 B2 | 2/2014 | Podjarny et al. |
| 8,752,183 B1 | 6/2014 | Heiderich et al. |
| 8,813,235 B2 | 8/2014 | Sidagni |
| 8,844,041 B1 | 9/2014 | Kienzle et al. |
| 9,015,301 B2 | 4/2015 | Redlich et al. |
| 9,015,847 B1 | 4/2015 | Kaplan et al. |
| 9,076,013 B1 | 7/2015 | Bailey, Jr. et al. |
| 9,100,430 B1 | 8/2015 | Seiver et al. |
| 9,183,397 B2 | 11/2015 | Futoranslcy et al. |
| 9,215,245 B1 | 12/2015 | Rajab et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,412,073 B2 | 8/2016 | Brandt et al. |
| 9,467,467 B2 | 10/2016 | Alamuri |
| 9,473,522 B1 | 10/2016 | Kotler et al. |
| 9,558,355 B2 | 1/2017 | Madou et al. |
| 9,760,716 B1 | 9/2017 | Mulchandani |
| 9,781,149 B1* | 10/2017 | Himler ................. H04L 69/22 |
| 9,781,160 B1 | 10/2017 | Irimie et al. |
| 9,800,603 B1 | 10/2017 | Sidagni |
| 9,824,222 B1 | 11/2017 | Kaplan et al. |
| 9,870,715 B2 | 1/2018 | Sadeh-Koniecpol et al. |
| 9,894,090 B2 | 2/2018 | Hebert et al. |
| 9,912,687 B1 | 3/2018 | Wescoe et al. |
| 10,038,711 B1 | 7/2018 | Gorodissky et al. |
| 10,068,095 B1 | 9/2018 | Segal et al. |
| 10,108,803 B2 | 10/2018 | Chari et al. |
| 10,122,750 B2 | 11/2018 | Gorodissky et al. |
| 10,182,040 B2 | 1/2019 | Hu et al. |
| 10,257,220 B2 | 4/2019 | Gorodissky et al. |
| 10,291,643 B2 | 5/2019 | Marquez et al. |
| 10,367,846 B2 | 7/2019 | Gorodissky et al. |
| 10,382,473 B1 | 8/2019 | Ashkenazy et al. |
| 10,412,112 B2 | 9/2019 | Ashkenazy et al. |
| 10,440,044 B1 | 10/2019 | Zini et al. |
| 10,447,721 B2 | 10/2019 | Lasser |
| 10,454,966 B2 | 10/2019 | Gorodissky et al. |
| 10,462,177 B1 | 10/2019 | Lasser et al. |
| 10,469,521 B1 | 11/2019 | Segal et al. |
| 10,498,803 B1 | 12/2019 | Zini et al. |
| 10,503,911 B2 | 12/2019 | Chari et al. |
| 10,505,969 B2 | 12/2019 | Gorodissky et al. |
| 10,534,917 B2 | 1/2020 | Segal |
| 10,574,684 B2 | 2/2020 | Segal et al. |
| 10,574,687 B1 | 2/2020 | Lasser |
| 10,581,895 B2 | 3/2020 | Ashkenazy et al. |
| 10,637,882 B2 | 4/2020 | Gorodissky et al. |
| 10,637,883 B1 | 4/2020 | Segal et al. |
| 10,645,113 B2 | 5/2020 | Gorodissky et al. |
| 10,652,269 B1 | 5/2020 | Segal et al. |
| 10,686,822 B2 | 6/2020 | Segal |
| 10,686,823 B2 | 6/2020 | Gorodissky et al. |
| 2003/0140223 A1 | 7/2003 | Desideri |
| 2003/0195861 A1 | 10/2003 | McClure et al. |
| 2003/0208616 A1 | 11/2003 | Laing et al. |
| 2003/0212779 A1 | 11/2003 | Boyter et al. |
| 2003/0217039 A1 | 11/2003 | Kurtz et al. |
| 2004/0015728 A1 | 1/2004 | Cole et al. |
| 2004/0078384 A1 | 4/2004 | Keir et al. |
| 2004/0095907 A1 | 5/2004 | Agee et al. |
| 2005/0086502 A1 | 4/2005 | Rayes et al. |
| 2005/0100157 A1 | 5/2005 | Gray et al. |
| 2005/0102534 A1 | 5/2005 | Wong |
| 2006/0015943 A1 | 1/2006 | Mahieu |
| 2007/0011319 A1 | 1/2007 | McClure et al. |
| 2007/0204347 A1 | 8/2007 | Caceres et al. |
| 2007/0271360 A1 | 11/2007 | Sahita et al. |
| 2008/0092237 A1 | 4/2008 | Yoon et al. |
| 2008/0104702 A1 | 5/2008 | Choi et al. |
| 2008/0172716 A1 | 7/2008 | Talpade et al. |
| 2008/0209567 A1 | 8/2008 | Lockhart et al. |
| 2008/0256638 A1* | 10/2008 | Russ .................. G06F 21/577 726/25 |
| 2008/0288822 A1 | 11/2008 | Wu et al. |
| 2009/0044277 A1 | 2/2009 | Aaron |
| 2009/0049553 A1 | 2/2009 | Vasudeva |
| 2009/0172813 A1 | 7/2009 | Aaron |
| 2010/0138925 A1 | 6/2010 | Barai et al. |
| 2011/0016513 A1 | 1/2011 | Bailey, Jr. |
| 2011/0035803 A1 | 2/2011 | Lucangeli Obes et al. |
| 2011/0061104 A1 | 3/2011 | Sarraute Yamada et al. |
| 2011/0078507 A1 | 3/2011 | Choi et al. |
| 2012/0174228 A1 | 7/2012 | Giakouminakis et al. |
| 2012/0255022 A1 | 10/2012 | Ocepek et al. |
| 2013/0014263 A1 | 1/2013 | Porcello et al. |
| 2013/0031635 A1 | 1/2013 | Lotem et al. |
| 2013/0297375 A1* | 11/2013 | Chapman ............ H04L 63/1483 705/7.28 |
| 2014/0007241 A1 | 1/2014 | Gula et al. |
| 2014/0137257 A1 | 5/2014 | Martinez et al. |
| 2014/0165204 A1 | 6/2014 | Williams et al. |
| 2014/0173739 A1 | 6/2014 | Ahuja et al. |
| 2014/0237606 A1 | 8/2014 | Futoransky et al. |
| 2014/0328423 A1 | 11/2014 | Agee et al. |
| 2015/0058993 A1 | 2/2015 | Choi et al. |
| 2015/0237063 A1 | 8/2015 | Cotton et al. |
| 2016/0044057 A1 | 2/2016 | Chenette et al. |
| 2016/0134653 A1 | 5/2016 | Vallone et al. |
| 2016/0147635 A1 | 5/2016 | Schwarzmann |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0006055 A1 | 1/2017 | Strom et al. |
| 2017/0013008 A1 | 1/2017 | Carey et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0123925 A1 | 5/2017 | Patnaik et al. |
| 2017/0149816 A1 | 5/2017 | Kelekar |
| 2017/0214701 A1 | 7/2017 | Hasan |
| 2017/0223043 A1 | 8/2017 | Munoz et al. |
| 2017/0279843 A1 | 9/2017 | Schultz et al. |
| 2017/0286690 A1 | 10/2017 | Chari et al. |
| 2017/0373923 A1 | 12/2017 | Kazachkov et al. |
| 2018/0018465 A1 | 1/2018 | Carey et al. |
| 2018/0103052 A1 | 4/2018 | Choudhury et al. |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0330103 A1 | 11/2018 | Chari et al. |
| 2018/0365429 A1 | 12/2018 | Segal |
| 2019/0014141 A1 | 1/2019 | Segal et al. |
| 2019/0036961 A1 | 1/2019 | Gorodissky et al. |
| 2019/0068631 A1 | 2/2019 | Ashkenazy et al. |
| 2019/0081974 A1 | 3/2019 | Lasser |
| 2019/0149572 A1 | 5/2019 | Gorodissky et al. |
| 2019/0182270 A1 | 6/2019 | Kim |
| 2019/0182286 A1 | 6/2019 | Zini |
| 2019/0245883 A1 | 8/2019 | Gorodissky et al. |
| 2019/0268369 A1 | 8/2019 | Gorodissky et al. |

(56) References Cited

U.S. PATENT DOCUMENTS

| | | |
|---|---|---|
| 2019/0312903 A1 | 10/2019 | Zini et al. |
| 2019/0364070 A1 | 11/2019 | Zini et al. |
| 2019/0387015 A1 | 12/2019 | Ashkenazy et al. |
| 2020/0106800 A1 | 4/2020 | Gorodissky et al. |
| 2020/0145449 A1 | 5/2020 | Segal et al. |
| 2020/0153852 A1 | 5/2020 | Segal et al. |
| 2020/0236130 A1 | 7/2020 | Gorodissky et al. |
| 2020/0280577 A1 | 9/2020 | Segal et al. |

FOREIGN PATENT DOCUMENTS

| | | |
|---|---|---|
| CN | 104009881 A | 8/2014 |
| EP | 1559008 A | 8/2005 |
| EP | 3079336 A1 | 10/2016 |
| WO | 0038036 A | 6/2000 |
| WO | 2008054982 A | 5/2008 |
| WO | 2010069587 A | 6/2010 |
| WO | 2013087982 A | 6/2013 |
| WO | 2015111039 A | 7/2015 |
| WO | 2016164844 A | 10/2016 |
| WO | 2018156394 A | 8/2018 |

OTHER PUBLICATIONS

Authors: Alhomidi and Reed Title: Attack Graph-Based Risk Assessment and Optimisation Approach International Journal of Network Security & Its Applications (IJNSA), vol. 6, No. 3, May 2014.

CN103916384 Machine Translation (by EPO and Google)—published Jul. 9, 2014 Zhong Li.

CN104009881 Machine Translation (by EPO and Google)—published Aug. 27, 2014 Wang Tian.

Goel, Jai Narayan et al. Ensemble Based Approach to Increase Vulnerability Assessment and Penetration Testing Accuracy. 2016 International Conference on Innovation and Challenges in Cyber Security (ICICCS-INBUSH). (Year: 2016).

Zhao, Jianming et al. Penetration Testing Automation Assessment Method Based on Rule Tree. 2015 IEEE International Conference on Cyber Technology in Automation, Control and Intelligent Systems (CYBER). (Year: 2015).

Hudic, Aleksandar et al. Towards a Unified Penetration Testing Taxonomy. 2012 International Conference on Privacy, Security, Risk and Trust and 2012 International Conference on Social Computing. (Year: 2012).

Qiu, Xue et al. Automatic generation algorithm of penetration graph in penetration testing. 2014 Ninth International Conference on P2P, Parallel, Grid, Cloud and Internet Computing. (Year: 2014).

Hemanidhi, Aniwat et al. Network Risk Evaluation from Security Metric of Vulnerability Detection Tools. TENCON 2014-2014 IEEE Region 10 Conference. (Year: 2014).

Bechtsoudis, A; Sklavos, N. Aiming at Higher Network Security Through Extensive Penetration Tests. IEEE Latin America Transactions vol. 10, Issue: 3. (Year: 2012).

* cited by examiner

SYSTEMS AND METHODS FOR DETERMINING AN OPPORTUNITY FOR NODE POISONING IN A PENETRATION TESTING CAMPAIGN, BASED ON ACTUAL NETWORK TRAFFIC

RELATED APPLICATIONS

The present application gains priority from U.S. Provisional Patent Application 62/881,768 filed on Aug. 1, 2019 and entitled "Determining a Node Positioning Opportunity in a Penetration Testing Campaign Based on Actual Network Traffic", which is incorporated herein by reference in its entirety.

BACKGROUND OF THE INVENTION

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization, or even of only a portion of it, might cause significant damage, up to completely shutting down all operations. Additionally, much of the data of the organization, if not all the data, exist somewhere on its networked computing system, including all confidential data comprising the "crown jewels" of the organization, such as prices, details of customers, purchase orders, employees' salaries, technical formulas, etc. Loss of such data or leaks of such data to unauthorized external entities might be disastrous for the organization.

Many organizational networks are connected to the Internet at least through one network node, and consequently may be subject to attacks by computer hackers or by hostile adversaries. Quite often the newspapers report incidents in which websites crashed, sensitive data was stolen, or service to customers was denied, where the failures were the results of hostile penetration into an organization's networked computing system.

Thus, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISOs (Computer Information Security Officers) will admit (maybe only off the record), that they don't really know how well they can withstand an attack from a given adversary. The only way to really know the strength and security of a system, is by trying to attack it as a real adversary would. This is known as red-teaming or penetration testing (pen testing, in short), and is a very common approach that is even required by regulation in some developed countries.

Penetration testing requires highly talented people to man the testing team. Those people should be familiar with each and every publicly known vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). However, external consultants are expensive and therefore are typically called in only for brief periods separated by long intervals in which no penetration testing is carried out. This makes the penetration testing ineffective, as vulnerabilities caused by new attacks, that appear almost daily, are discovered only months after becoming serious threats to the organization.

Additionally, even rich organizations that can afford hiring talented experts for in-house penetration testing teams do not achieve good protection. Testing for vulnerabilities of a large network containing many types of computers, operating systems, network routers and other devices is both a very complex and a very tedious process. The process is prone to human errors such as missing testing for certain threats or misinterpreting the damages of certain attacks. Additionally, because a process of full testing against all threats is quite long the organization might again end with a too long discovery period after a new threat appears.

In view of the above deficiencies, automated penetration testing solutions were introduced in recent years by several vendors. These automated solutions reduce human involvement in the penetration testing process, or at least in some of its functions. Some of those systems automatically discover and report vulnerabilities of a networked system, potential damages that might be caused to the networked system, and potential trajectories of attack that may be employed by an attacker.

A penetration testing process involves at least the following main functions: (i) a reconnaissance function, (ii) an attack function, and (iii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

FIG. 1A (PRIOR ART) is a block diagram of code modules of a typical penetration testing system. FIG. 1B (PRIOR ART) is a related flow-chart.

FIG. 1A shows a typical prior art penetration testing system and its main functions, where in addition to the three main functions listed above there is also an optional cleanup function. Even though the figures show the reconnaissance, attack and reporting functions as operating in strictly sequential order, this is not necessarily so. For example, the attack and the reporting functions may operate in parallel or in an interleaved way, with the reporting function reporting first results obtained by the attack function, while the attack function is working on additional results. Similarly, the reconnaissance and the attack functions may operate in parallel or in an interleaved way, with the attack function detecting a vulnerability based on first data collected by the reconnaissance function, while the reconnaissance function is working on collecting additional data.

A reconnaissance function is the function within a penetration testing system that handles the collection of data about the tested networked system. The collected data may include internal data of network nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof.

However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results.

Similarly, the reconnaissance and the attack functions may operate in parallel or in an interleaved way, with the attack function detecting a vulnerability based on first data collected by the reconnaissance function, while the reconnaissance function is working on collecting additional data.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) one or more human-interface device(s) 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory. Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

Penetration testing systems can be characterized as carrying out "actual attack penetration testing" or "simulated penetration testing".

A prior art actual attack penetration testing system carries out penetration testing attempting to attack the tested networked system. Such a system actually accesses the tested networked system during the test, and does not limit itself to simulation or evaluation. This includes verifying that the tested networked system can be compromised by actively attempting to compromise the system, and then checking if the system was indeed compromised. A possible side-effect of executing an actual attack penetration test may be the compromising of the tested networked system.

Typically, actual attack penetration testing system operates by iteratively compromising network nodes of the tested networked system. At each iteration during the testing process some of the network nodes of the tested networked system are already compromised by the potential attacker, and the penetration testing system attempts to compromise one or more additional network node, which are not yet compromised, by utilizing the already-compromised network nodes that are operating under the control of the attacker. Once one or more additional network nodes are compromised, they are added to the group of already-compromised network nodes and a new iteration of the testing begins.

A simulated penetration testing system carries out penetration testing while avoiding disturbance to the tested networked system and specifically avoiding any risk of compromising the networked system. This implies that whenever there is a need to verify that the tested networked system can be compromised by an operation or a sequence of operations, the verification is accomplished by simulating the results of that operation or sequence of operations or by otherwise evaluating them, without taking the risk of actually compromising the tested networked system.

Typically, simulated penetration testing systems operate by iteratively determining the compromisability of network nodes of the tested networked system. At each iteration during the testing process some of the network nodes of the tested networked system are considered to be already known to be compromisable by the potential attacker, and the penetration testing system attempts to determine the compromisability of one or more additional network nodes, not yet known to be compromisable, by utilizing the already-known-to-be-compromisable network nodes that are assumed to operate under the control of the attacker. Once one or more additional network nodes are determined to be compromisable, they are added to the group of already-known-to-be-compromisable network nodes and a new iteration of the testing begins.

Each iteration of compromising a new network node or determining the compromisability of a new network node includes verifying the success of the compromising or the determining under current conditions in the tested networked system. As explained above, in actual attack penetration testing systems such verifying is achieved by actively attempting to compromise the new network node, while in simulated penetration testing systems such verifying is achieved by simulating or evaluating of the compromising step.

In the present disclosure, the terms "a compromised node" and "a node known to be compromisable" are synonyms and are used interchangeably. When referring to an actual-attack penetration testing system, both terms mean a node that is already compromised in the current campaign. When referring to a simulated penetration testing system, both terms mean a node that was already determined to be compromisable in the current campaign.

The Problem to Solve

Quite frequently, an attacker progresses within an attacked networked system by using an already-compromised network node to compromise another target network node, not yet compromised. A common method for such compromising is by sending a poisoned file from the already-compromised network node to the target network node to be compromised next. The poisoned file may be sent as an attachment to an email sent from the already-compromised network node to the target node. As the attacker already controls the already-compromised node, it can cause the already-compromised node to send any email containing any attachment to any other reachable network node.

The poisoned file contains malicious computer code, which, when the file is opened by a user in the receiving node, is executed and causes compromising of the receiving node, thereby giving the attacker control of the receiving node. The poisoned file may be a dedicated special-purpose file created by the attacker for the purpose of poisoning nodes. Alternatively, the poisoned file may be an innocent file created or obtained during normal operation of the already-compromised node, which was modified by the attacker to include malicious computer code.

Consequently, in a simulated penetration testing system, there is frequently a need to determine whether a poisoning attempt of a given target network node, which is not yet known to be compromisable, carried out from a given origin network node, already known to be compromisable, will be successful. In other words, there is a need to determine whether sending an email containing a poisoned attachment file from the given origin network node would result in the user of the given target network node opening the poisoned file.

In a simulated penetration testing system, which does not risk actual poisoning of nodes, such a determination must be made without actually sending a poisoned file to the target network node. Moreover, the determination must be made without actually sending even a non-poisoned file from the given origin network node to the target network node, because, in a simulated penetration testing system, the given origin network node cannot be caused to send any email and any attachment file, as the given origin network node is not really under the control of the simulated penetration testing system.

There are several methods that may be employed by a simulated penetration testing system in order to determine whether a poisoning attempt of a given target network node, not yet known to be compromisable, carried out from a given origin network node, already known to be compromisable, will be successful:

A. Use the simplifying assumption that any compromised origin network node sending a poisoned file to a not-yet-compromised target network node causes the target network node to become compromised. In other words, assume that a user of a target network node always opens a received poisoned file. This assumption implies that the only condition required for compromising the target network node is having connectivity between some already-compromised node and the target node.

Obviously, this is a highly pessimistic assumption that does not reliably simulate the real world. In reality, many users refrain from opening email attachment files that they are not expecting, or refrain from opening email attachment files from users they do not fully know and trust.

B. Obtain and use information about the habits of the user of the target network node, which is not yet known to be compromisable, when opening email attachments received from other nodes of the networked system. The actions of users of multiple nodes are monitored during a learning phase preceding the execution of the penetration testing campaign and statistics are collected regarding those users responses to email attachments received at their corresponding nodes as a result of normal operation of the networked system.

For example, a first node may receive 20 email attachment files during the learning phase, and a first user operating the first node may open 18 of them. This represents a probability of 90% that an attachment file received at the first node will be opened. As this is a high percentage, it is a reasonable approximation to assume that the first node will be compromised whenever a poisoned file is sent to it from another node.

On the other hand, a second node may receive 40 email attachment files during the learning phase, and a second user operating the second node may open 5 of them. This represents a probability of 12.5% that an attachment file received at the second node will be opened. As this is a low percentage, it is a reasonable approximation to assume that the second node will not be compromised whenever a poisoned file is sent to it from another node.

Consequently, a threshold percentage level is set—for nodes that are found during the learning phase to open attachment files with a probability higher than the threshold level it is assumed that such files will always be opened, while for nodes that are found during the learning phase to open attachment files with a probability lower than the threshold level, it is assumed that such files will never be opened.

This method is more realistic than the previous one, but it still does not reliably simulate the real world. The assumptions for nodes whose statistics are close to the threshold value may be inaccurate and, in many cases, wrong predictions may be made. Moreover, this method does not take into consideration the dependence of decisions taken by some users when receiving an attachment file on the identity of the sender of the mail containing the attachment file. For some users, if they know and trust the sender of the email they will, with high probability, open the attachment, and if they do not know the sender well enough they will, with high probability, refrain from opening the attachment file. This aspect is not addressed by this probability-based approach.

C. Obtain and use information about the habits of the user of the target network node, not yet known to be compromisable, when opening email attachments received from other nodes of the networked system, where the information is sender-dependent. The actions of users of multiple nodes are monitored during a learning phase preceding the execution of the penetration testing campaign and statistics are collected about the users responses to email attachments received at their corresponding nodes from specific senders as a result of normal operation of the networked system.

For example, a first node may receive 20 email attachment files during the learning phase, and a user operating the first node may open 10 of them. However, the 20 attachments were received from two senders—10 attachments were received from a first sender (e.g. the manager of the user of the first node) of which 9 attachments were opened, and the other 10 attachments were received from a second sender (e.g. an employee in the company's warehouse) of which only one attachment was opened. This represents a probability of 90% that an attachment file received at the first node from the first sender will be opened and a probability of 10% that an attachment file received at the first node from the second sender will be opened. In this case, it is a reasonable approximation to assume that the first node will be compromised whenever a poisoned file is sent to it from the first sender, but the first node will not be compromised whenever the poisoned file is sent to it from the second sender.

On the other hand, a second node may receive 40 email attachment files during the learning phase and the user operating the second node may open 20 of them. However, the 40 attachments were received from two senders—20 attachments were received from a third sender (e.g. a colleague of the user of the second node in the same department) of which 12 attachments were opened, and the other 20 attachments were received from a fourth sender (e.g. another colleague of the user of the second node in the same department) of which only 8 attachments were opened. This represents a probability of 60% that an attachment file received at the second node from the third sender will be opened and a probability of 40% that an attachment file received at the second node from the fourth sender will be opened.

The threshold percentage level may be set to 50%, in which case it is assumed that the second node will be compromised whenever a poisoned file is sent to it from the third node, but the second node will not be compromised whenever a poisoned file is sent to it from the fourth sender.

For combinations of sending and receiving nodes for which insufficient statistics are collected during the learning phase (e.g. for an attachment sent from the first sender to the second node, where such an event did not occur during the learning phase), the penetration testing system may resort to the previous method and use global, non sender dependent statistics of the receiving node as the determining factor.

This method is closer to reality than the previous one, but it still does not provide a fully reliable simulation of the real world. Even for a sender/receiver combination for which there is sufficient statistical data, if the determined probability that the receiver opens attachments from the sender is close to the threshold value, the assumption used might be inaccurate and, in many cases, wrong predictions may be made. For a sender/receiver combination for which there is insufficient statistical data, the accuracy is even worse and is the same as in the previous method.

An additional drawback of this method (as well as of the previous one) is that the statistics are collected during a learning phase that precedes the testing phase. A user's behavior during the learning phase might be different from his behavior during the penetration testing campaign. For example, a user may be aware of the fact that his behavior is monitored during the learning phase and therefore will act with extra caution during that time, not opening any attachment with respect to which he has even a slight suspicion. However, that user might not be aware of the execution of a background penetration testing campaign, and consequently during the campaign may act with his usual carelessness, opening many attachments be would be better avoiding. In such case, during the campaign it will be assumed that most or all of the poisoning attempts of the network node of that user will fail, while in reality the opposite assumption is the one correctly representing the real world.

In all the exemplary methods discussed above, the method may conclude that a poisoning attempt of a given receiving node carried out from a given sender node would be successful, while in reality this would not be the case. Such false positives are rather harmful, as they might cause an administrator of the tested networked system to invest resources in improving security unnecessarily. For some of the methods discussed above, the opposite error might also occur—the method might conclude that a poisoning attempt of a given receiving node carried out from a given sender node would be unsuccessful, while in reality this would not be the case. Such false negatives are even more harmful, as they might cause an administrator of the tested networked system to get a false sense of security and consequently not to invest security-improving efforts when he actually should.

There is thus a need in the art for a method to be used by simulated penetration testing systems to determine whether a poisoning attempt of a given network node, not yet known to be compromisable, carried out from a second given network node, already known to be compromisable, would be successful, where the method is reliable in the sense of correctly predicting what would occur in the real world under such circumstances.

SUMMARY OF THE INVENTION

Some embodiments of the invention relate to methods and systems for identifying a specific way for an attacker to compromise a networked system, where the specific way includes a step of poisoning a specific network node by the specific network node receiving a poisoned email body or a poisoned email attachment.

According to an aspect of a first embodiment of the invention, there is provided a method for carrying out, by a penetration testing system, a penetration testing campaign of a networked system including a plurality of network nodes, the method including:

a. determining that a first network node of the plurality of network nodes is compromisable by an attacker during the penetration testing campaign;

b. determining, by the penetration testing system, that during the penetration testing campaign, a first email containing a first attachment was sent from the first network node to a second network node of the plurality of network nodes, the second network node being different from the first network node;

c. determining, by the penetration testing system, that during the penetration testing campaign, a second email containing a second attachment was received by the second network node;

d. determining, by the penetration testing system, that during the penetration testing campaign, a user of the second network node opened the second attachment contained in the second email;

e. determining, by the penetration testing system, that the first email and the second email are a same email;

f. based on the determinations in steps (a), (b), (c), (d), and (e), concluding, by the penetration testing system, that the second network node is compromisable by the attacker during the penetration testing campaign;

g. based on the concluding that the second network node is compromisable by the attacker, determining, by the penetration testing system, a specific way for the attacker to compromise the networked system, the specific way for the attacker to compromise the networked system including a step of sending an email containing a poisoned attachment from the first network node to the second network node; and h. reporting the determined specific way for the attacker to compromise the networked system, the reporting including at least one operation selected from the group consisting of (i) causing a display device to display a report including information about the determined specific way to compromise the networked system, (ii) recording the report including the information about the determined specific way to compromise the networked system in a file, and (iii) electronically transmitting the report including the information about the determined specific way to compromise the networked system.

In some embodiments, the penetration testing system includes (A) a penetration testing software module installed on a remote computing device, and (B) a reconnaissance agent software module installed on at least the first network node and the second network node; the determining that the first email containing the first attachment was sent from the first network node is carried out by executing code of the reconnaissance agent software module installed on the first network node; the determining that the second email containing the second attachment was received by the second network node is carried out by executing code of the reconnaissance agent software module installed on the second network node; the determining that the user of the second network node opened the second attachment contained in the second email is carried out by executing code of the reconnaissance agent software module installed on the second network node; and the determining of the specific way for the attacker to compromise the networked system is carried out, at least in part, by executing code of the penetration testing software module installed on the remote computing device.

In some embodiments, the determining that the first email containing the first attachment was sent from the first network node is carried out subsequent to the determining that the first network node is compromisable by the attacker. In other embodiments, the determining that the first email containing the first attachment was sent from the first network node is carried out prior to the determining that the first network node is compromisable by the attacker.

In some embodiments, the determining that the first email and the second email are a same email includes determining that a time at which the second email was received by the second network node is subsequent to a time at which the first email was sent from the first network node. In some embodiments, the determining that the first email and the second email are a same email includes determining that a duration that elapsed from a time at which the first email was sent from the first network node to a time at which the second email was received by the second network node does not exceed a given threshold. In some embodiments, the determining that the first email and the second email are a same email includes determining that a first name of the first attachment contained in the first email is the same as a second name of the second attachment contained in the second email. In some embodiments, the determining that the first email and the second email are a same email includes determining that a first title of the first email is the same as a second title of the second email. In some embodiments, the determining that the first email and the second email are a same email includes determining that a first body of the first email is the same as a second body of the second email. In some embodiments, the determining that the first email and the second email are a same email includes determining that a source address field of the second email includes an address of the first network node.

In some embodiments, the method further includes estimating, by the penetration testing system, whether or not the second network node would have been compromised as a result of the user of the second network node opening the second attachment contained in the second email if the second attachment would have been a poisoned attachment, wherein the determining that the second network node is compromisable by the attacker during the penetration testing campaign is further based on the estimating providing a positive result.

In some embodiments, the estimating is based on a file type of the second attachment contained in the second email. In some embodiments, the estimating includes determining a software application used by the second network node for opening files having the file type of the second attachment contained in the second email. In some embodiments, the estimating includes determining a software application most commonly used by network nodes of the networked system for opening files having the file type of the second attachment contained in the second email.

In some embodiments, the estimating is based on determining whether the second attachment contained in the second email is password protected. In some embodiments, the estimating is based on determining whether the second attachment contained in the second email is encrypted.

According to another aspect of the first embodiment of the invention, there is provided a system for carrying out a penetration testing campaign of a networked system including a plurality of network nodes, the system including:
a. a penetration-testing-campaign module including:
  i. one or more penetration-testing campaign processors; and
  ii. a penetration-testing-campaign non-transitory computer readable storage medium for instructions execution by the one or more penetration-testing-campaign processors, the penetration-testing-campaign non-transitory computer readable storage medium having stored:
    1. first instructions to determine that a first network node of the plurality of network nodes is compromisable by an attacker during the penetration testing campaign;
    2. second instructions to determine that during the penetration testing campaign, a first email containing a first attachment was sent from the first network node to a second network node of the plurality of network nodes, the second network node being different from the first network node;
    3. third instructions to determine that during the penetration testing campaign, a second email containing a second attachment was received by the second network node;
    4. fourth instructions to determine that during the penetration testing campaign, a user of the second network node opened the second attachment contained in the second email;
    5. fifth instructions to determine that the first email and the second email are a same email;
    6. sixth instructions to conclude, based on the determinations made when executing the first, second, third, fourth, and fifth instructions, that the second network node is compromisable by the attacker during the penetration testing campaign; and
    7. seventh instructions to determine, based on the concluding when executing the sixth instructions, that the second network node is compromisable by the attacker, a specific way for the attacker to compromise the networked system, the specific way for the attacker to compromise the networked system including a step of sending an email containing a poisoned attachment from the first network node to the second network node; and
b. a reporting module including:
  i. one or more reporting processors; and
  ii. a reporting non-transitory computer readable storage medium for instructions execution by the one or more reporting processors, the reporting non-transitory computer readable storage medium having stored instructions to report the determined specific way for the attacker to compromise the networked system, the instructions to report including at least one set of instructions selected from the group consisting of (i) instructions to cause a display device to display a report including information about the determined specific way to compromise the networked system, (ii) instructions to record the report including the information about the determined specific way to compromise the networked system in a file, and (iii) instructions to electronically transmit the report including the information about the determined specific way to compromise the networked system.

According to yet another aspect of the first embodiment of the invention, there is provided a system for carrying out a penetration testing campaign of a networked system, the networked system including at least a first network node including one or more first processors and a second network node including one or more second processors, the first and second network nodes connected by one or more networks and being in communication with a remote computing device, the remote computing device including one or more processors, the system including:
a. a first reconnaissance agent non-transitory computer readable storage medium for instructions execution by the one or more first processors, the first reconnaissance agent non-transitory computer readable storage medium having stored:
  i. instructions to determine that during the penetration testing campaign, a first email containing a first attachment was sent from the first network node to the second network node;
b. a second reconnaissance agent non-transitory computer readable storage medium for instructions execution by the one or more second processors, the second reconnaissance agent non-transitory computer readable storage medium having stored:
  i. instructions to determine that during the penetration testing campaign, a second email containing a second attachment was received by the second network node;
  ii. instructions to determine that during the penetration testing campaign, a user of the second network node opened the second attachment contained in the second email;
c. a penetration-testing-campaign non-transitory computer readable storage medium for instructions execution by the one or more processors of the remote computing device, the penetration-testing-campaign non-transitory computer readable storage medium having stored:
  i. first instructions to determine that the first network node is compromisable by an attacker during the penetration testing campaign;
  ii. second instructions to determine that the first email and the second email are a same email;
  iii. third instructions to conclude, based on the determinations made when executing the first and second instructions and based on results of execution of the instructions stored in the first and second reconnaissance agent non-transitory computer readable storage media, that the second network node is compromisable by the attacker during the penetration testing campaign;
  iv. fourth instructions to determine, based on the concluding when executing the third instructions, that the second network node is compromisable by the attacker, a specific way for the attacker to compromise the networked system, the specific way for the attacker to compromise the networked system including a step of sending an email containing a poisoned attachment from the first network node to the second network node; and
  v. fifth instructions to report the determined specific way for the attacker to compromise the networked system, the instructions to report including at least one set of instructions selected from the group consisting of (i) instructions to cause a display device to display a report including information about the determined specific way to compromise the networked system, (ii) instructions to record the report including the information about the determined specific way to compromise the networked system in a file, and (iii) instructions to electronically transmit the report including the information about the determined specific way to compromise the networked system.

In some embodiments, the instructions to determine that the first email containing the first attachment was sent from the first network node are executed subsequent to execution of the first instructions to determine that the first network node is compromisable by the attacker. In other embodiments, the instructions to determine that the first email containing the first attachment was sent from the first network node are executed prior to execution of the first instructions to determine that the first network node is compromisable by the attacker.

In some embodiments, the second instructions to determine that the first email and the second email are a same email include instructions to determine that a time at which the second email was received by the second network node is subsequent to a time at which the first email was sent from the first network node. In some embodiments, the second instructions to determine that the first email and the second email are a same email include instructions to determine that a duration that elapsed from a time at which the first email was sent from the first network node to a time at which the second email was received by the second network node does not exceed a given threshold. In some embodiments, the second instructions to determine that the first email and the second email are a same email include instructions to determine that a first name of the first attachment contained in the first email is the same as a second name of the second attachment contained in the second email. In some embodiments, the second instructions to determine that the first email and the second email are a same email include instructions to determine that a first title of the first email is the same as a second title of the second email. In some embodiments, the second instructions to determine that the first email and the second email are a same email include instructions to determine that a first body of the first email is the same as a second body of the second email. In some embodiments, the second instructions to determine that the first email and the second email are a same email include instructions to determine that a source address field of the second email includes an address of the first network node.

In some embodiments, the penetration-testing-campaign non-transitory computer readable storage medium further has stored sixth instructions to estimate whether or not the second network node would have been compromised as a result of the user of the second network node opening the second attachment contained in the second email if the second attachment would have been a poisoned attachment, and wherein the third instructions to conclude that the second network node is compromisable by the attacker during the penetration testing campaign are further based on a result of execution of the sixth instructions to estimate being a positive result.

In some embodiments, the sixth instructions to estimate are based on a file type of the second attachment contained in the second email. In some embodiments, the sixth instructions to estimate include instructions to determine a software application used by the second network node for opening files having the file type of the second attachment contained in the second email. In some embodiments, the sixth instructions to estimate include instructions to determine a software application most commonly used by network nodes of the networked system for opening files having the file type of the second attachment contained in the second email.

In some embodiments, the sixth instructions to estimate are based on whether the second attachment contained in the second email is password protected. In some embodiments, the sixth instructions to estimate are based on whether the second attachment contained in the second email is encrypted.

According to an aspect of a second embodiment of the invention, there is provided a method for carrying out, by a penetration testing system, a penetration testing campaign of a networked system including a plurality of network nodes, the method including:

a. determining that a first network node of the plurality of network nodes is compromisable by an attacker during the penetration testing campaign;

b. determining, by the penetration testing system, that during the penetration testing campaign, a first email was sent from the first network node to a second network node of the plurality of network nodes, the second network node being different from the first network node;

c. determining, by the penetration testing system, that during the penetration testing campaign, a second email was received by the second network node;

d. determining, by the penetration testing system, that during the penetration testing campaign, a user of the second network node opened the second email;

e. determining, by the penetration testing system, that the first email and the second email are a same email;

f. based on the determinations in steps (a), (b), (c), (d), and (e), concluding, by the penetration testing system, that the second network node is compromisable by the attacker during the penetration testing campaign;

g. based on the concluding that the second network node is compromisable by the attacker, determining, by the penetration testing system, a specific way for the attacker to compromise the networked system, the specific way for the attacker to compromise the networked system including a step of sending a poisoned email including a poisoned email body from the first network node to the second network node; and h. reporting the determined specific way for the attacker to compromise the networked system, the reporting including at least one operation selected from the group consisting of (i) causing a display device to display a report including information about the determined specific way to compromise the networked system, (ii) recording the report including the information about the determined specific way to compromise the networked system in a file, and (iii) electronically transmitting the report including the information about the determined specific way to compromise the networked system.

In some embodiments, the penetration testing system includes (A) a penetration testing software module installed on a remote computing device, and (B) a reconnaissance agent software module installed on at least the first network node and the second network node; the determining that the first email was sent from the first network node is carried out by executing code of the reconnaissance agent software module installed on the first network node; the determining that the second email was received by the second network node is carried out by executing code of the reconnaissance agent software module installed on the second network node; the determining that the user of the second network node opened the second email is carried out by executing code of the reconnaissance agent software module installed on the second network node; and the determining of the specific way for the attacker to compromise the networked system is carried out, at least in part, by executing code of the penetration testing software module installed on the remote computing device.

In some embodiments, the determining that the first email was sent from the first network node is carried out subsequent to the determining that the first network node is compromisable by the attacker. In other embodiments, the determining that the first email was sent from the first network node is carried out prior to the determining that the first network node is compromisable by the attacker.

In some embodiments, the determining that the first email and the second email are a same email includes determining that a time at which the second email was received by the second network node is subsequent to a time at which the first email was sent from the first network node. In some embodiments, the determining that the first email and the second email are a same email includes determining that a duration that elapsed from a time at which the first email was sent from the first network node to a time at which the second email was received by the second network node does not exceed a given threshold. In some embodiments, the determining that the first email and the second email are a same email includes determining that a first title of the first email is the same as a second title of the second email. In some embodiments, the determining that the first email and the second email are a same email includes determining that a first body of the first email is the same as a second body of the second email. In some embodiments, the determining that the first email and the second email are a same email includes determining that a source address field of the second email includes an address of the first network node.

In some embodiments, the method further includes estimating, by the penetration testing system, whether or not the second network node would have been compromised as a result of the user of the second network node opening the second email if a body of the second email would have been poisoned, wherein the determining that the second network node is compromisable by the attacker during the penetration testing campaign is further based on the estimating providing a positive result.

In some embodiments, the estimating is based on determining an email software application used by the second network node for opening emails. In some embodiments, the estimating is based on determining an email software application most commonly used by network nodes of the networked system for opening emails.

According to another aspect of the second embodiment of the invention, there is provided a system for carrying out a penetration testing campaign of a networked system including a plurality of network nodes, the system including:
a. a penetration-testing-campaign module including:
   i. one or more penetration-testing campaign processors; and
   ii. a penetration-testing-campaign non-transitory computer readable storage medium for instructions execution by the one or more penetration-testing-campaign processors, the penetration-testing-campaign non-transitory computer readable storage medium having stored:
      1. first instructions to determine that a first network node of the plurality of network nodes is compromisable by an attacker during the penetration testing campaign;
      2. second instructions to determine that during the penetration testing campaign, a first email was sent from the first network node to a second network node of the plurality of network nodes, the second network node being different from the first network node;
      3. third instructions to determine that during the penetration testing campaign, a second email was received by the second network node;
      4. fourth instructions to determine that during the penetration testing campaign, a user of the second network node opened the second email;
      5. fifth instructions to determine that the first email and the second email are a same email;
      6. sixth instructions to conclude, based on the determinations made when executing the first, second, third, fourth, and fifth instructions, that the second network node is compromisable by the attacker during the penetration testing campaign; and
      7. seventh instructions to determine, based on the concluding when executing the sixth instructions that the second network node is compromisable by the attacker, a specific way for the attacker to compromise the networked system, the specific way for the attacker to compromise the networked system including a step of sending a poisoned email including a poisoned email body from the first network node to the second network node; and
b. a reporting module including:
   i. one or more reporting processors; and
   ii. a reporting non-transitory computer readable storage medium for instructions execution by the one or more reporting processors, the reporting non-transitory computer readable storage medium having stored instructions to report the determined specific way for the attacker to compromise the networked system, the instructions to report including at least one set of instructions selected from the group consisting of (i) instructions to cause a display device to display a report including information about the determined specific way to compromise the networked system, (ii) instructions to record the report including the information about the determined specific way to compromise the networked system in a file, and (iii) instructions to electronically transmit the report including the information about the determined specific way to compromise the networked system.

According to yet another aspect of a second embodiment of the invention, there is provided a system for carrying out a penetration testing campaign of a networked system, the networked system including at least a first network node including one or more first processors and a second network node including one or more second processors, the first and second network nodes connected by one or more networks and being in communication with a remote computing device, the remote computing device including one or more processors, the system including:
a. a first reconnaissance agent non-transitory computer readable storage medium for instructions execution by the one or more first processors, the first reconnaissance agent non-transitory computer readable storage medium having stored:
   i. instructions to determine that during the penetration testing campaign, a first email was sent from the first network node to the second network node;
b. a second reconnaissance agent non-transitory computer readable storage medium for instructions execution by the one or more second processors, the second reconnaissance agent non-transitory computer readable storage medium having stored:
  i. instructions to determine that during the penetration testing campaign, a second email was received by the second network node;
  ii. instructions to determine that during the penetration testing campaign, a user of the second network node opened the second email;
c. a penetration-testing-campaign non-transitory computer readable storage medium for instructions execution by the one or more processors of the remote computing device, the penetration-testing-campaign non-transitory computer readable storage medium having stored:
  i. first instructions to determine that the first network node is compromisable by an attacker during the penetration testing campaign;
  ii. second instructions to determine that the first email and the second email are a same email;
  iii. third instructions to conclude, based on the determinations made when executing the first and second instructions and based on results of execution of the instructions stored in the first and second reconnaissance agent non-transitory computer readable storage media, that the second network node is compromisable by the attacker during the penetration testing campaign;
  iv. fourth instructions to determine, based on the concluding when executing the third instructions that the second network node is compromisable by the attacker, a specific way for the attacker to compromise the networked system, the specific way for the attacker to compromise the networked system including a step of sending a poisoned email including a poisoned email body from the first network node to the second network node; and
  v. fifth instructions to report the determined specific way for the attacker to compromise the networked system, the instructions to report including at least one set of instructions selected from the group consisting of (i) instructions to cause a display device to display a report including information about the determined specific way to compromise the networked system, (ii) instructions to record the report including the information about the determined specific way to compromise the networked system in a file, and (iii) instructions to electronically transmit the report including the information about the determined specific way to compromise the networked system.

In some embodiments, the instructions to determine that the first email was sent from the first network node are executed subsequent to execution of the first instructions to determine that the first network node is compromisable by the attacker. In other embodiments, the instructions to determine that the first email was sent from the first network node are executed prior to execution of the first instructions to determine that the first network node is compromisable by the attacker.

In some embodiments, the second instructions to determine that the first email and the second email are a same email include instructions to determine that a time at which the second email was received by the second network node is subsequent to a time at which the first email was sent from the first network node. In some embodiments, the second instructions to determine that the first email and the second email are a same email include instructions to determine that a duration that elapsed from a time at which the first email was sent from the first network node to a time at which the second email was received by the second network node does not exceed a given threshold. In some embodiments, the second instructions to determine that the first email and the second email are a same email include instructions to determine that a first title of the first email is the same as a second title of the second email. In some embodiments, the second instructions to determine that the first email and the second email are a same email include instructions to determine that a first body of the first email is the same as a second body of the second email. In some embodiments, the second instructions to determine that the first email and the second email are a same email include instructions to determine that a source address field of the second email includes an address of the first network node.

In some embodiments, the penetration-testing-campaign non-transitory computer readable storage medium further has stored sixth instructions to estimate whether or not the second network node would have been compromised as a result of the user of the second network node opening the second email if a body of the second email would have been poisoned, and wherein the third instructions to conclude that the second network node is compromisable by the attacker during the penetration testing campaign are further based on a result of the execution of the sixth instructions to estimate being a positive result.

In some embodiments, the sixth instructions to estimate include instructions to determine an email software application used by the second network node for opening emails. In some embodiments, the sixth instructions to estimate include instructions to determine an email software application most commonly used by network nodes of the networked system for opening emails.

Unless otherwise defined, all technical and scientific terms used herein have the same meaning as commonly understood by one of ordinary skill in the art to which the invention pertains, unless explicitly defined in this application. In case of conflict, the specification, including definitions, will take precedence.

As used herein, the terms "comprising". "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF SOME EMBODIMENTS OF THE INVENTION

Figure 1A:
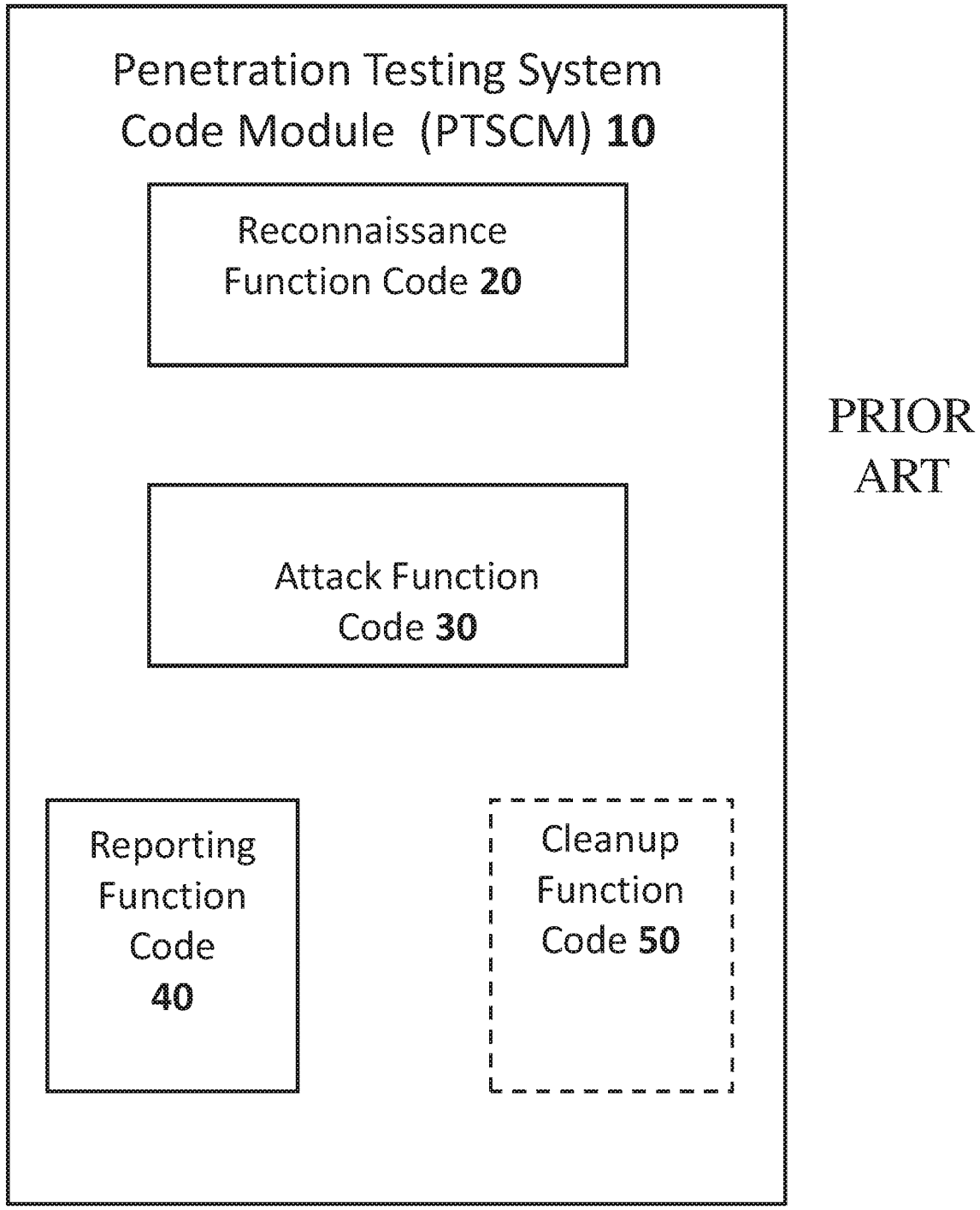
FIG. 1A (PRIOR ART) is a block diagram of code modules of a typical penetration testing system.
Figure 1B:
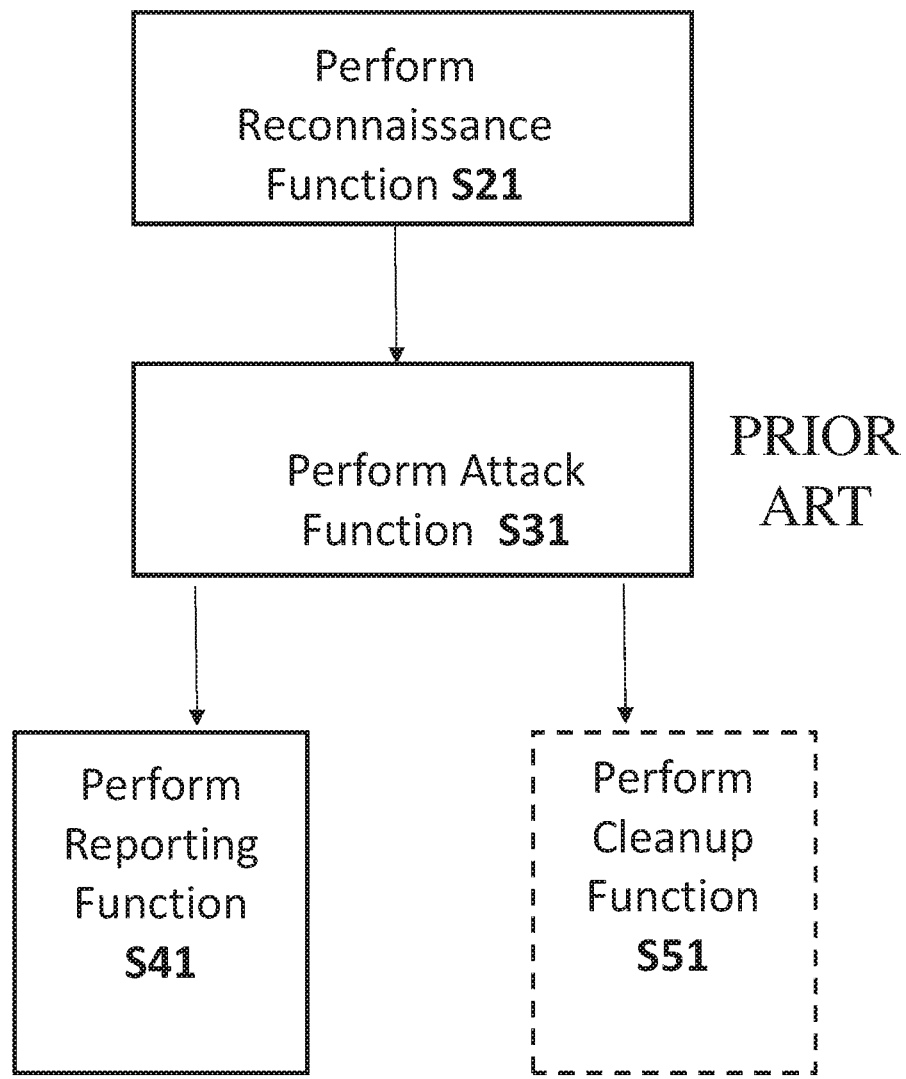
FIG. 1B (PRIOR ART) is a flow-chart related to the system of FIG. 1A.
Figure 2:
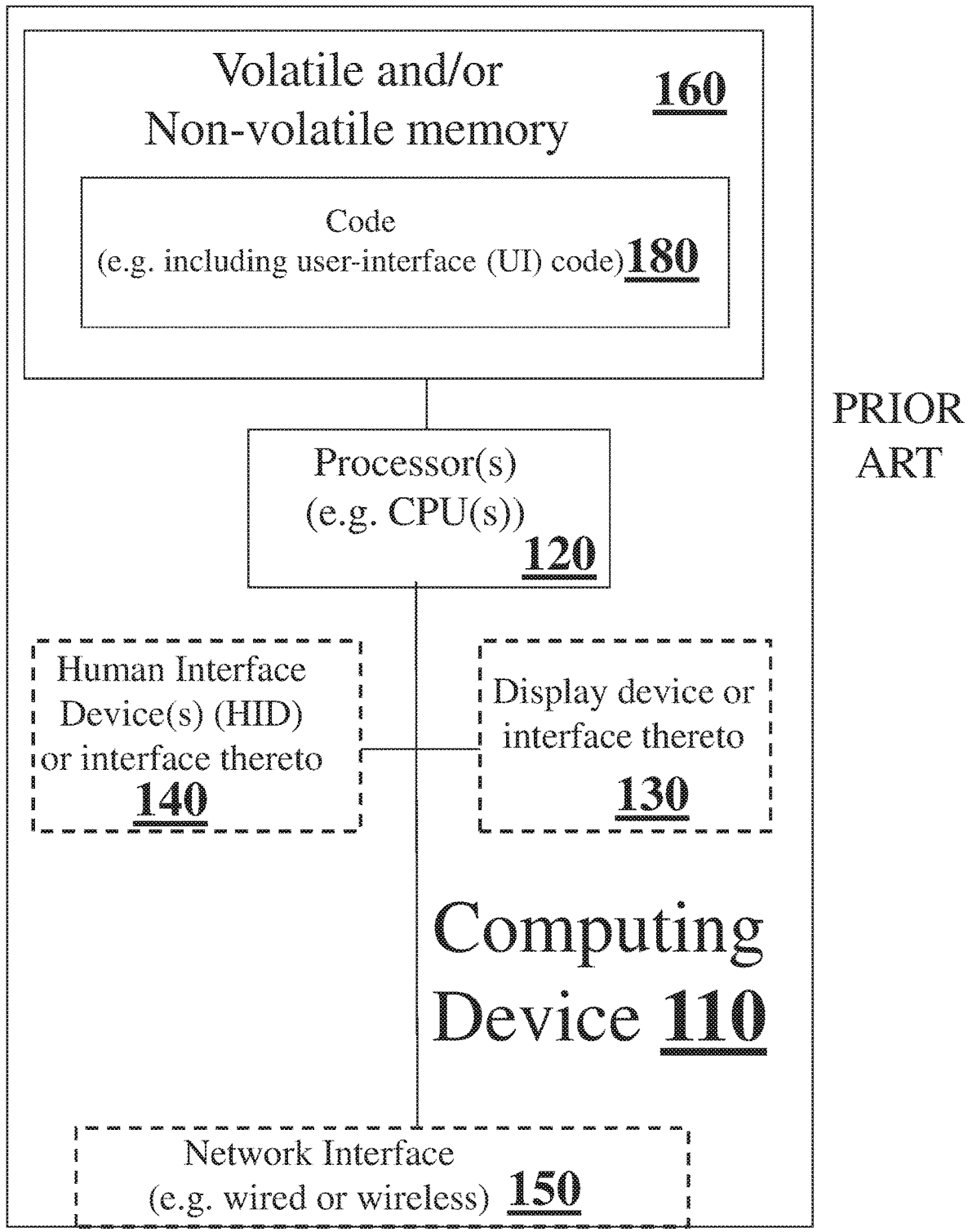
FIG. 2 (PRIOR ART) illustrates a prior art computing device.

The invention, in some embodiments, relates to penetration testing of a networked system, and specifically to methods and systems for identifying a specific way for an attacker to compromise a networked system, by predicting the compromisability of a network node, not yet known to be compromisable, in a simulated penetration testing system.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

The present invention provides a solution to the challenges discussed hereinabove with respect to the prior art, and specifically provides a penetration testing system that predicts compromisability of nodes without relying on assumptions or statistics.

In the following description, the phrase "a node opening an attachment" is used in the sense of "a user operating the node opens an attachment". Similarly, other actions that are written as being carried out by the node, may be carried out automatically by the node or manually by a user operating the node.

The proposed solution is a method that, instead of relying on unproved assumptions or on collected statistics, relies on actual events that occur in the tested networked system during the execution of a penetration testing campaign in order to determine whether one node can be poisoned from another node. The actual events are events of sending and receiving emails containing attachments that occur as part of normal (not test-related) operation of the tested networked system.

As simulated penetration testing systems do not control network nodes of the tested networked system, even when the nodes are known to be compromisable, it is not possible to cause network nodes to send emails at the will of the penetration testing system. Since the proposed solution does not rely on causing the sending of emails, it is suitable for use in simulated penetration testing systems.

The proposed method monitors, during the execution of a penetration testing campaign: (i) emails containing file attachments that are sent from network nodes, and (ii) emails containing file attachments that are received in network nodes. In addition, the proposed solution monitors, for each received attachment file, whether or not it is opened at the receiving network node.

According to the proposed method, a necessary and sufficient condition for determining that a node A, already known to be compromisable, can poison a node B, not yet known to be compromisable, by sending it an email containing a poisoned attachment file, is that it is known with certainty that, while the penetration testing campaign is executing: (i) node A sent an email containing an attachment to node B, (ii) node B received the email containing the attachment sent from node A, and (iii) node B opened the attachment file contained in the received email.

The logic behind the above rule is that if node A had already been compromised by an attacker when sending the email containing the attachment, the attacker would have been able to detect the email sending event, and to poison the attachment file by adding into it malicious computer code. Since it is known that the email sent by node A was received at node B, and that the attachment contained in that email was opened, one can conclude with certainty that, had the attacker poisoned the file in node A, node B would have become compromised.

It should be noted that an attacker that is in control of a given network node can always poison a file sent by the given node as an attachment to an email, even if the copy of the file in the non-volatile storage media of the given node is write-protected or cannot be altered because of some other mechanism (e.g. the media containing the file is physically write protected, as in a CD-ROM). The attacker can bypass the protection by poisoning, on-the-fly, the copy of the file that is attached to the outgoing email.

Even if for some reason an attacker cannot poison the attachment included in an email generated by node A, the logic behind the rule presented above is still valid—if node A were already compromised by an attacker when node A sent the email containing the attachment, then the attacker would have been able to cause node A, which is under its control, to send another email to the same destination containing a poisoned attachment file prepared in advance by the attacker and having the same file type. If the user of the receiving node opened the attachment which was actually sent, it is highly likely that the same user would have also opened the attacker's attachment received from the same sender and having the same file type.

Consequently, according to the proposed method, when a simulated penetration testing system attempts to determine whether a first node, already known to be compromisable, can be used to change the state of a second node from "not yet known to be compromisable" to "already known to be compromisable", the simulated penetration testing system checks for fulfilment of the conditions listed in the rule above. If, and only if, all three conditions are satisfied, the simulated penetration testing system will conclude that the change of state of the second node is possible and justified.

By contrast to some of the methods mentioned above, that rely on collected statistics about events of handling email attachments, which events occurred prior to running the current penetration testing campaign, the proposed solution relies only on events that occur during the execution of the current campaign. As such, it is clear that such events would have been relevant to the success of an attacker attacking the tested networked system at the time of the current campaign.

In one embodiment of the proposed solution, the sending of the email by node A must occur after node A is determined to be compromisable. The reasoning for this restriction is that a real attacker would only be able to use the method of sending the poisoned mail to compromise node B if he is already in control of node A.

In another embodiment of the proposed solution, the sending of the email by node A can occur any time during the execution of the penetration testing campaign, including before node A is determined to be compromisable. The reasoning for avoiding the above restriction is that if node B was found to open an attachment it received from node A during the campaign, it is reasonable to assume that node B will act in the same way at a later time during the same campaign.

For any embodiment of the proposed solution, the rule for determining the success or failure of an attempt to compromise a given node B, not yet known to be compromisable, from a node A, already known to be compromisable, by sending an email containing a poisoned attachment file, may additionally include tests for ensuring that the email detected to be sent from node A is the same email detected to be received by node B. Examples for such tests include:
  (i) the time at which the email is received at node B is later than the time at which the email was sent from node A;
  (ii) the difference in time between the sending of the email from node A and the receiving of the email by node B does not exceed a given threshold;
  (iii) the name of the attachment file sent by node A is identical to the name of the attachment file received by node B;
  (iv) the title of the email containing the attachment file sent by node A is identical to the title of the email containing the attachment file received by node B;
  (v) the destination address field of the email containing the attachment file sent by node A includes the address of node B; and
  (vi) the source address field of the email containing the attachment file received by node B includes the address of node A.

Even though the proposed solution, as described above, adequately addresses the deficiencies of the prior art methods, which are discussed above, it still may occasionally incorrectly predict the success or failure of an attempt to poison a node by sending it a poisoned file attachment from another node. The reason for this is that not every file type is equally suitable for a poisoning attack. While poisoned executable files (e.g. ".exe" files) will always cause poisoning when opened, other types of files may not necessarily cause poisoning, even if they are poisoned. In order for a poisoned non-executable file to cause the compromising of a node that opens it, the software application opening the file must have a vulnerability that causes it to execute poisoned malicious code hidden within the poisoned file. Most or all of the applications used to open some types of files, such as ".jpeg" files, are not known to have such vulnerabilities. Consequently, poisoned files of such types will, in most cases, not cause the compromising of a node that opens them. There are other types of files, such as ".pdf" files, which may be opened by many types of applications, some of which are known to have one or more vulnerabilities to poisoned content, while others are not known to have such vulnerabilities. Consequently, the success or failure of a poisoning attempt using a file of such a file type will depend on the specific software application used by the receiving node to open the file.

As seen in the file type discussion above, even when the three conditions of the above rule are met (i.e. (i) node A sent an email containing an attachment, (ii) node B received the sent email containing the attachment from node A, and (iii) node B opened the attachment file contained in the received email), it is still not guaranteed that the poisoning attempt will be successful.

If the attachment file sent by node A happens to be of a specific type, where the most commonly used application for opening such a file type is not known to have a vulnerability, then the fact that node B opened the file does not imply that node B would, or could, be compromised by poisoning the file. One might argue that in such case, the attacker could replace the attachment file on-the-fly, to cause node B to receive an attachment of a different type, for which the most commonly used application has a known vulnerability. However, the fact that node B opened the file would still not imply that node B could be compromised—the user of node B may have opened the original file because he knew that this type of file is not risky, but he would not have opened a file of the replacement type, which he knows to be risky. In this case, an attack by file replacement would not succeed.

Some embodiments of the proposed solution address this uncertainty by requiring an additional condition in order to determine that compromising by attachment poisoning will succeed. The additional condition ensures that the type of attachment file sent from node A to node B is reasonably suitable for successful poisoning. For example, the additional condition may require that the type of the attachment file is such that the most commonly used application for opening that file type has at least one known vulnerability that causes it to execute hidden poisoned malicious code. In another example, the additional condition may require that the type of the attachment file is such that each of the two most commonly used applications for opening that file type (in case there is more than one such application) has at least one known vulnerability that causes it to execute hidden poisoned malicious code. In still another example, the additional condition may require that the type of the attachment file is such that the specific application installed and used by the receiving node for opening that file type has at least one known vulnerability that causes it to execute hidden poisoned malicious code. Other variations of the additional condition are also possible, as long as the additional condition makes the determination of success or failure of a poisoning attempt closer to reality by taking into consideration the file type of the attachment being sent.

One other case in which the proposed solution may incorrectly predict the result of a poisoning attempt by sending a poisoned file attachment is when the attachment file is password-protected. When the attachment file is password-protected, an attacker might not be able to poison the file, or the copy of the file that is attached to the email.

Consequently, the proposed solution may be improved by additionally requiring that the attachment file not be password-protected.

Both embodiments listed above which add conditions relating to the attachment may be used, or implemented, in a single penetration testing campaign.

In addition to compromising a node by sending it an email containing a poisoned attachment, as discussed above, the node may also be compromised by sending it a poisoned email that does not include an attachment. This is analogous to the attachment case, with the email body including malicious code, and the email application executing the malicious code when opening the email. This compromising is possible because an email application might have a vulnerability that causes it to execute malicious code hidden within the body of an email message.

A second embodiment of the disclosed technology addresses poisoning of a node by exploiting a vulnerability in the email application used by the node. In this case, a node A, already known to be compromisable, can poison a node B, not yet known to be compromisable, by sending it an email, when the email application of node B is known to have a vulnerability causing the email application to execute malicious code contained in the body of an email message.

The proposed solutions are applicable to all types of simulated penetration testing systems, whether using reconnaissance agents or not. However, these solutions are particularly suitable for reconnaissance agent penetration testing systems. In such systems, many (possibly all) of the network nodes taking part in the test have a reconnaissance agent software module installed, whose task is to collect information about the hosting node and to report the collected information to a central computing device of the penetration testing system.

In such reconnaissance agent penetration testing systems, the ability to detect information relating to sent or received emails is built-in into the system's architecture and requires almost no extra infrastructural effort. Detection of such information may include detection of sending an email, receiving an email, the existence of an attachment file in an outgoing email or in an incoming email, opening of an attachment file from an incoming email, a file type of an attachment attached to an outgoing or an incoming email, and/or the password-protection state of an attachment, some or all of which may be required for implementing the teachings herein. A reconnaissance agent installed in a node locally monitors the email events and activities in its hosting node and reports them to the central penetration testing system computing device. The central computing device uses the reported data from agents installed in nodes of the tested networked system to determine the success or failure of attempts by attackers to compromise nodes, by sending emails having poisoned email bodies, or emails containing poisoned attachment files, from other nodes that are already known to be compromisable to those nodes.

U.S. Pat. No. 10,038,711, which is fully incorporated by reference herein describes an example of a reconnaissance agent penetration testing system that may implement the proposed solution.

Methods by which a reconnaissance agent (or 'agent') can detect the opening of a file by a software application and the identity of the software application are known in the art, and any such method may be used.

An example of a suitable method for a reconnaissance agent to collect information relating to emails is by using the Windows Management Instrumentation (WMI) infrastructure of the Windows Operating System. WMI is the Microsoft implementation of Web-Based Enterprise Management (WBEM), which is an industry initiative to develop a standard technology for accessing management information in an enterprise environment. Using WMI, the reconnaissance agent can be notified of every new created process. After being notified about a new process, the reconnaissance agent can determine the software application related to the process (e.g. Word, Outlook, etc.), and in most cases also the name of the opened file that was provided to the software application as a parameter.

Another example of a suitable method for obtaining email related information is for an agent to monitor the registry for file opening operations. Microsoft Office applications, which are among the most commonly used software applications for opening email attachments, have pre-defined locations in the registry for every open file. The agent can be notified when a new registry entry is created by the Microsoft Office applications in those pre-defined locations. As such, the agent can obtain both an identity of the application and the file name.

Yet another example of a suitable method for obtaining email related information is for an agent to obtain a list of running processes, for example by running a suitable query. This is supported by the Win32 API of the Windows Operating System. A similar API exists in the Linux OS, and the same list can also be obtained by enumerating the Linux "/proc" directory. The agent can poll the processes list once per a pre-defined short time interval and detect new processes that were created since its previous polling of the list.

A further example of a suitable method for obtaining email related information is for an agent to implement a customized file system driver that is invoked whenever a file is opened from the storage device and provides the functionality described above.

Methods by which an agent can detect that a specific file being opened is an attachment to an email are well known in the art, and any such method can be used.

One suitable method for identifying that an opened file is an attachment is by associating the agent with the email software application's routine in charge of opening attachments from within email messages, so that the agent is notified whenever the routine identifies opening a file attached to an email message from the window presenting the email. Once the agent is notified, it knows that the opened file is an email attachment. If the email program is Microsoft Outlook, then the same goal can be achieved by implementing an extension that monitors the opening of attachments.

An agent should be capable of dealing with cases in which a user first saves an attachment file to a storage device, and only later opens the stored attachment file from the storage device. In one example of a suitable method for such a case, the agent hooks into the email program's routine in charge of saving attachments from within email messages, and is notified whenever the routine identifies saving a file attached to an email message from the window presenting the message. Once the agent is notified, it knows that the saved file is an email attachment that was not opened yet in this network node. The agent maintains a list of still-not-opened attachment files that are candidates for containing malicious code because of their respective file types. The list is stored in non-volatile memory, so that it is preserved over re-booting of the network node hosting the agent. Whenever the agent is notified about opening a file by one of the relevant software applications (where the file is not opened from within the email window), it checks whether the file being opened is included in the list of suspicious not-yetopened attachment files. If the file being opened appears in the list, it is handled as above, as if it was just received as an attachment to an email, and is removed from the list. Otherwise, if the file does not appear in the list, nothing is done, as the file was not received in an email or was received in an email but already opened before.

The above logic may complicate the agent, and therefore the operation of a penetration testing system may be simplified by 'giving up' on attachment files that are not opened from within the email message window. This reduces the number of opportunities for proving compromisability of network nodes during a penetration testing campaign but does not cause any false determinations of compromisability.

To summarize, the main benefit of the proposed solution is that it improves the reliability of predicting, by a simulated penetration testing system, whether an attempt to compromise a node by sending it a poisoned attachment file or a poisoned email body from another node will succeed. The improvement is achieved by relying on actual email-sending and email-receiving events occurring in the tested networked system during the execution of a penetration testing campaign.

Figure 3A:
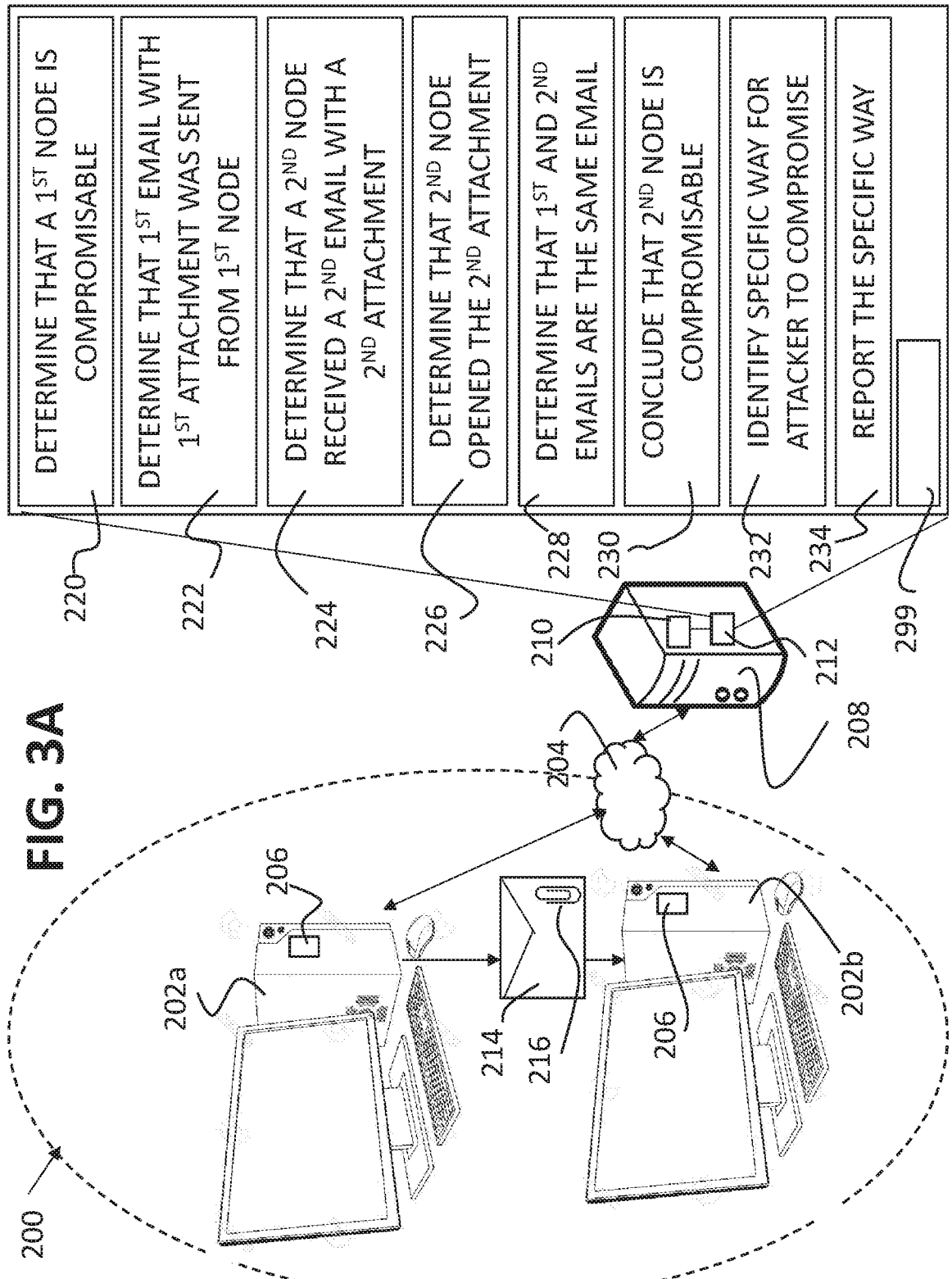
FIGS. 3A and 3B are schematic illustrations of systems for identifying a specific way for an attacker to compromise a networked system, where the specific way includes a step of poisoning a specific network node by the specific network node receiving a poisoned email attachment, according to first embodiments of the invention.
Figure 3B:
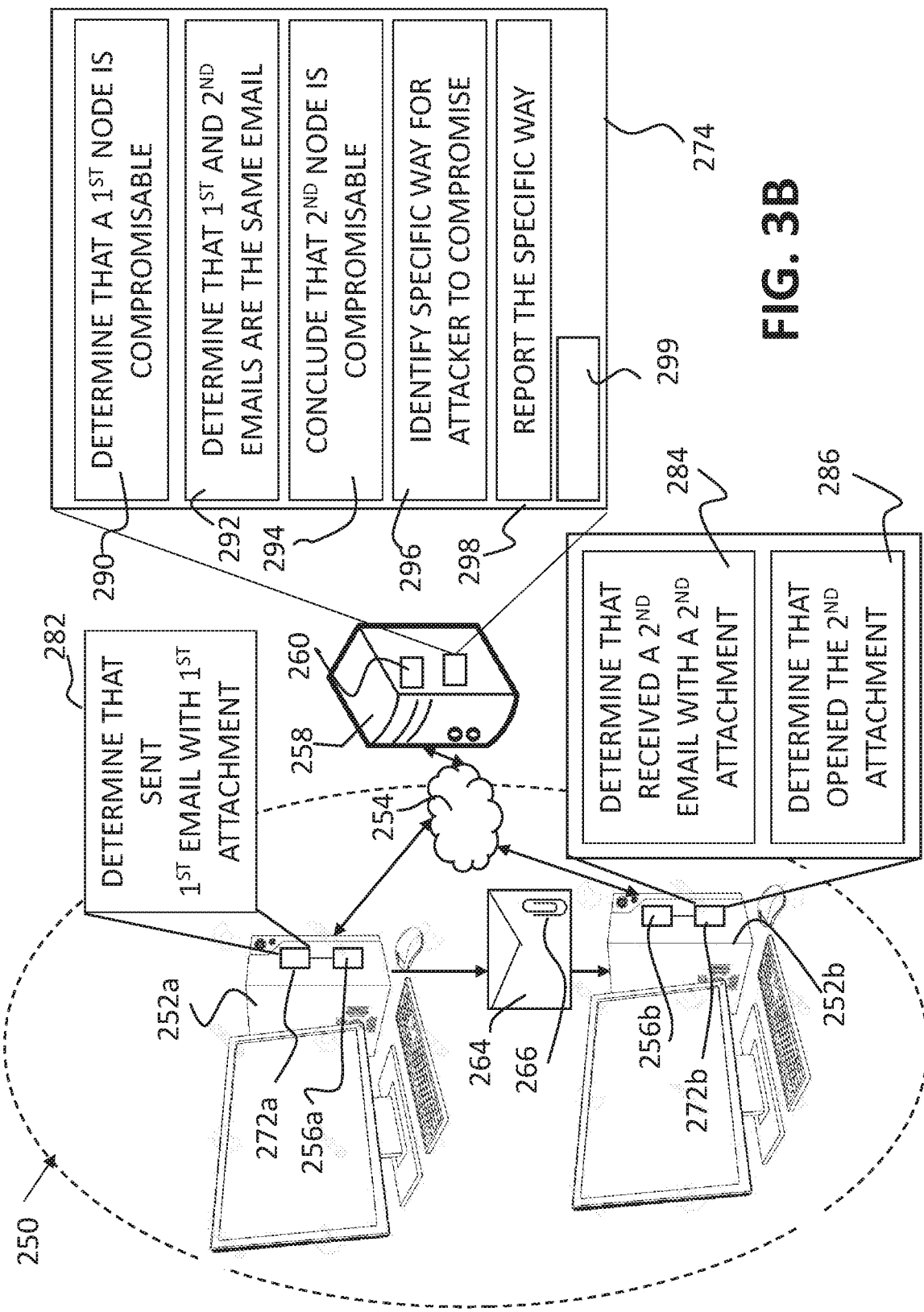

Reference is now made to FIGS. 3A and 3B, which are schematic illustrations of systems for identifying a specific way for an attacker to compromise a networked system, where the specific way includes a step of poisoning a specific network node by the specific network node receiving a poisoned email attachment, according to first embodiments of the invention.

As seen in FIG. 3A, the networked system 200 (indicated by a dashed oval in FIG. 3A) includes a plurality of network nodes interconnected by one or more networks. In the illustrated embodiment, a first network node 202a and a second network node 202b are interconnected by a network 204. As seen, each of network nodes 202a and 202b includes one or more processors 206, illustrated in FIG. 3A as a single processor.

Each of network nodes 202a and 202b is in electronic communication, for example via network(s) 204, with a penetration testing remote computing device 208, which forms a centralized penetration testing system for determining compromisability of networked system 200, and specifically for determining compromisability of a specific network node of the networked system by receipt of a poisoned email attachment. The centralized penetration testing system implemented by computing device 208 is a simulated penetration testing system.

Penetration testing remote computing device 208 includes one or more processors 210 and one or more storage media 212.

In some embodiments, the penetration testing remote computing device 208 may include a penetration-testing-campaign module, including campaign management functionality of the penetration testing system and a reporting module including a reporting functionality of the penetration testing system, substantially as described hereinabove with respect to FIG. 1A. The penetration-testing-campaign module may be associated with a penetration-testing-campaign processor forming part of processors 210, and with a penetration-testing-campaign storage medium forming part of storage media 212. Similarly, the reporting module may be associated with a reporting processor forming part of processors 210, and with a reporting storage medium forming part of storage media 212.

For the sake of brevity, the description hereinbelow relates to a single processor 210 and a single storage medium 212.

The penetration testing storage medium 212 may be a non-transitory computer readable storage medium, and includes instructions to be executed by processor(s) 210 of penetration testing remote computing device 208.

In the illustrated embodiment, it is assumed that an email 214, having a poisoned attachment 216 including malicious computer code, may be sent from network node 202a to network node 202b, for example via network 204. As described hereinbelow, remote computing device 208 includes instructions for identifying whether, if node 202a were compromised, the email 214 and attachment 216 would cause compromising of node 202b.

Specifically, penetration testing storage medium 212 has stored:

first instructions 220 to determine that a first network node 202a is compromisable by an attacker during a penetration testing campaign;

second instructions 222 to determine that, during the penetration testing campaign, a first email 214 containing a first attachment 216 was sent from the first network node 202a to a second network node 202b, the second network node being different from the first network node;

third instructions 224 to determine that, during the penetration testing campaign, a second email containing a second attachment was received by the second network node 202b;

fourth instructions 226 to determine that, during the penetration testing campaign, a user of the second network node 202b opened the second attachment contained in the second email;

fifth instructions 228 to determine that the first email and the second email are the same email;

sixth instructions 230 to conclude that the second network node 202b is compromisable by the attacker during the penetration testing campaign, where the conclusion is based on the determinations made when executing instructions 220, 222, 224, 226, and 228; and seventh instructions 232 to determine a specific way for the attacker to compromise the networked system, where the determination is based on the conclusion reached when executing instructions 230, and specifically where the specific way for the attacker to compromise the networked system includes a step of sending an email containing a poisoned attachment from the first network node 202a to the second network node 202b; and eighth instructions 234 to report the specific way for the attacker to compromise the networked system, as determined when executing the instructions 232.

Eighth instructions 234 include at least one of: (i) instructions to cause a display device to display information about the specific way for the attacker to compromise the networked system, (ii) instructions to store the information about the specific way for the attacker to compromise the networked system in a file, and (iii) instructions to electronically transmit the information about the specific way for the attacker to compromise the networked system.

In some embodiments, the eighth instructions 234 are implemented in a separate module, and as such the eighth instructions may be stored in a reporting memory and may be executed by one or more reporting processors, which, in the illustrated embodiment, are considered to be part of memory 212 and processor(s) 210, respectively.

Turning to FIG. 3B, the networked system 250 (indicated by a dashed oval in FIG. 3B) includes a plurality of network nodes interconnected by one or more networks. In the illustrated embodiment, a first network node 252a and a second network node 252b are interconnected by a network 254. As seen, network node 252a includes one or more processors 256a, and network node 252b includes one or more processors 256b, both illustrated in FIG. 3B as a single processor. Each of network nodes 252a and 252b is in electronic communication, for example via network(s) 254, with a penetration testing remote computing device 258, which includes one or more processors 260, and one or more storage media 274.

In some embodiments, the penetration testing remote computing device 258 may include a penetration-testing-campaign module, including campaign management functionality of the penetration testing system and a reporting module including a reporting functionality of the penetration testing system, substantially as described hereinabove with respect to FIG. 1A. The penetration-testing-campaign module may be associated with a penetration-testing-campaign processor forming part of processors 260, and with a penetration-testing-campaign storage medium forming part of storage media 274. Similarly, the reporting module may be associated with a reporting processor forming part of processors 260, and with a reporting storage medium forming part of storage media 274.

For the sake of brevity, the description hereinbelow relates to a single processor 260 and a single storage medium 274.

The penetration testing storage medium 274 may be a non-transitory computer readable storage medium, and includes instructions to be executed by processor(s) 260 of penetration testing remote computing device 258.

In the illustrated embodiment, it is assumed that an email 264, having a poisoned attachment 266 including malicious computer code, may be sent from network node 252a to network node 252b, for example via network 254.

A distributed system for determining compromisability of networked system 250, and specifically for determining compromisability of a specific network node 252b of the networked system 250 by receipt of a poisoned email attachment includes a first reconnaissance agent storage medium 272a installed on network node 252a, a second reconnaissance agent storage medium 272b installed on network node 252b, and the penetration testing storage medium 274 of penetration testing remote computing device 258.

Each of reconnaissance agent storage media 272a and 272b may be a non-transitory computer readable storage medium, and includes instructions to be executed by respective processor(s) 256a and 256b of the respective network node 252a and 252b on which the reconnaissance agent in installed and which is in electronic communication with remote computing device 258.

Specifically, first reconnaissance agent storage medium storage medium 272a has stored instructions 282 to determine that, during the penetration testing campaign, a first email 264 containing a first attachment 266 was sent from the first network node 252a to second network node 252b, the second network node being different from the first network node.

Second reconnaissance agent storage medium 272b has stored:

instructions 284 to determine that, during the penetration testing campaign, a second email containing a second attachment was received by the second network node 252b; and instructions 286 to determine that, during the penetration testing campaign, a user of the second network node 252b opened the second attachment contained in the second email.

Penetration testing storage medium 274 has stored:

first instructions 290 to determine that the first network node 252a is compromisable by an attacker during a penetration testing campaign;

second instructions 292 to determine that the first email and the second email are the same email;

third instructions 294 to conclude that the second network node 252b is compromisable by the attacker during the penetration testing campaign, where the conclusion is based on the determinations made when executing instructions 282, 284, 286, 290, and 292;

fourth instructions 296 to determine a specific way for the attacker to compromise the networked system, where the determination is based on the conclusion reached when executing instructions 294, and specifically where the specific way for the attacker to compromise the networked system includes a step of sending an email containing a poisoned attachment from the first network node 252a to the second network node 252b; and fifth instructions 298 to report the specific way for the attacker to compromise the networked system, as determined when executing the instructions 296.

Fifth instructions 298 include at least one of: (i) instructions to cause a display device to display information about the specific way for the attacker to compromise the networked system, (ii) instructions to store the information about the specific way for the attacker to compromise the networked system in a file, and (iii) instructions to electronically transmit the information about the specific way for the attacker to compromise the networked system.

In some embodiments, the eighth instructions 298 are implemented in a separate module, and as such the eighth instructions may be stored in a reporting memory and may be executed by one or more reporting processors, which, in the illustrated embodiment, are considered to be part of memory 274 and processor(s) 260, respectively.

The following relates to the centralized penetration-testing system illustrated FIG. 3A, as well as to the distributed penetration-testing system illustrated in FIG. 3B.

In some embodiments, the instructions to determine that the first email containing the first attachment was sent from the first network node (instructions 222 of FIG. 3A or instructions 282 of FIG. 3B) are executed subsequent to execution of the instructions to determine that the first network node is compromisable by the attacker (instructions 220 of FIG. 3A or instructions 290 of FIG. 3B).

In other embodiments, the instructions to determine that the first email containing the first attachment was sent from the first network node (instructions 222 of FIG. 3A or instructions 282 of FIG. 3B) are executed prior to execution of the instructions to determine that the first network node is compromisable by the attacker (instructions 220 of FIG. 3A or instructions 290 of FIG. 3B).

In some embodiments, the instructions to determine that the first email and the second email are the same email (instructions 228 of FIG. 3A or instructions 292 of FIG. 3B) include any one of more of the following:

instructions to determine that a time at which the second email was received by the second network node (202b of FIG. 3A or 252b of FIG. 3B) is subsequent to a time at which the first email was sent from the first network node (202a of FIG. 3A or 252a of FIG. 3B);

instructions to determine that a duration that elapsed from a time at which the first email was sent from the first network node (202a of FIG. 3A or 252a of FIG. 3B) to a time at which the second email was received by the second network node (202b of FIG. 3A or 252b of FIG. 3B) does not exceed a given threshold.

instructions to determine that a first name of the first attachment contained in the first email is the same as a second name of the second attachment contained in the second email.

instructions to determine that a first title of the first email is the same as a second title of the second email.

instructions to determine that a first body of the first email is the same as a second body of the second email.

instructions to determine that a source address field of the second email includes an address of the first network node.

In some embodiments, the penetration testing non-transitory computer readable storage medium (storage medium 212 of FIG. 3A or storage medium 274 of FIG. 3B) further has stored additional instructions 299 to estimate whether or not the second network node (202b of FIG. 3A or 252b of FIG. 3B) would have been compromised as a result of the user of the second network node opening the second attachment contained in the second email, if the second attachment would have been a poisoned attachment. In such an embodiment, the instructions to determine that the second network node is compromisable by the attacker during the penetration testing campaign (instructions 230 of FIG. 3A or instructions 294 of FIG. 3B) are further based on a result of execution of said instructions to estimate being a positive result.

In some such embodiments, the instructions to estimate include instructions to estimate based on a file type of the second attachment contained in the second email. In some such embodiments, the instructions to estimate include instructions to determine a software application used by the second network node for opening files having the file type of the second attachment contained in the second email. In some other such embodiments, the instructions to estimate include instructions to determine a software application most commonly used by network nodes of the networked system for opening files having the file type of the second attachment contained in the second email.

In some embodiments, the instructions to estimate include instructions to estimate based on at least one of:
  determining whether the second attachment contained in the second email is password protected; and
  determining whether the second attachment contained in the second email is encrypted.

In some embodiments of the distributed system of FIG. 3B, the additional instructions 299 are stored in the second reconnaissance agent storage medium 272b and are executed by second network node 252b.

Figure 4:
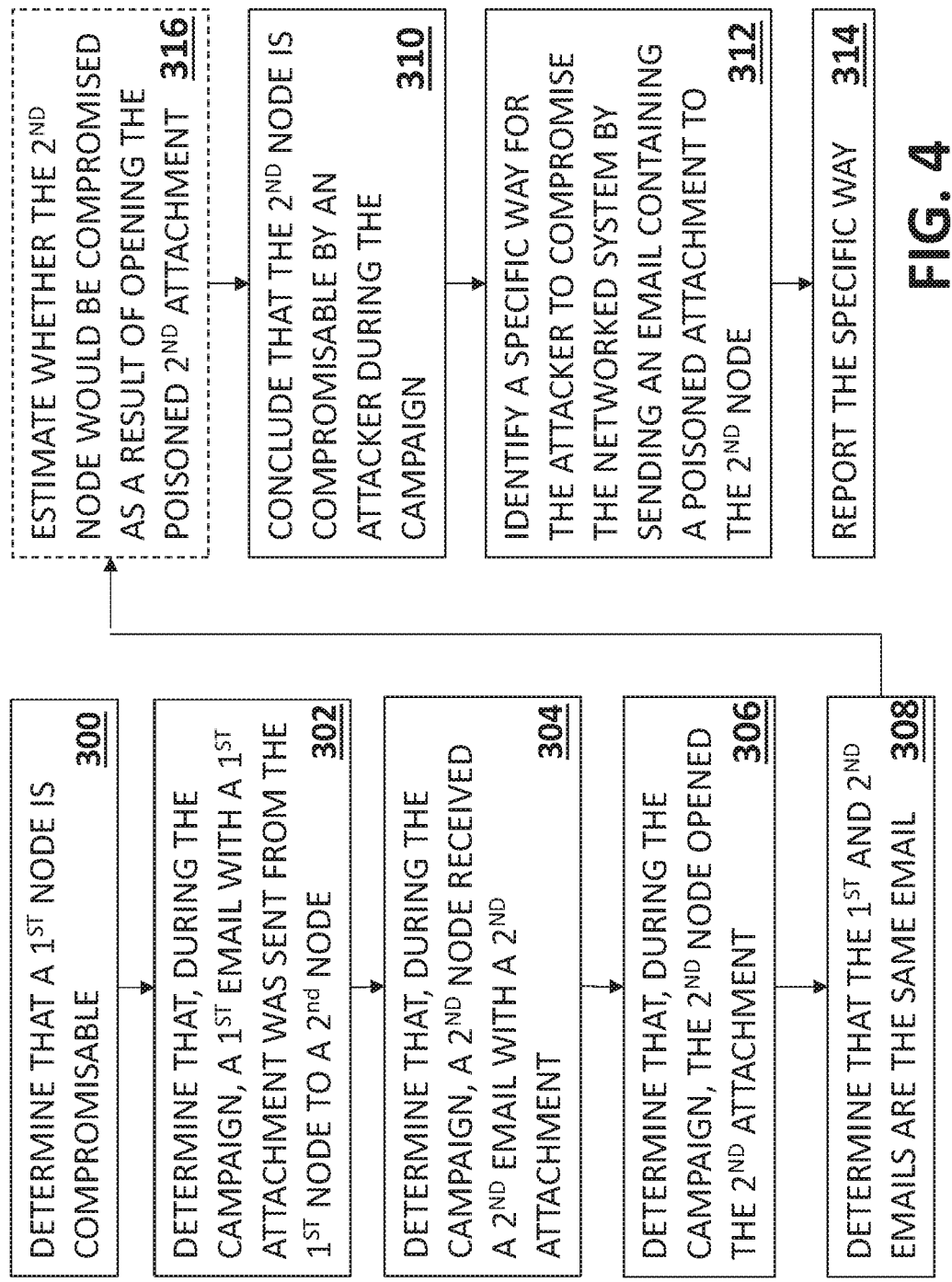
FIG. 4 is a flow chart of a method for identifying a specific way for an attacker to compromise a networked system, where the specific way includes a step of poisoning a specific network node by the specific network node receiving a poisoned email attachment, according to first embodiments of the invention.

Reference is now additionally made to FIG. 4, which is a flow chart for identifying a specific way for an attacker to compromise a networked system, where the specific way includes a step of poisoning a specific network node in the networked system, such as network node 202b in networked system 200 of FIG. 3A or network node 252b in networked system 250, by the specific network node receiving a poisoned email attachment, such as email attachment 216 or 266, according to firsts embodiment of the invention.

For brevity, the following description is provided mainly with respect to the centralized penetration testing system of FIG. 3A, such that all of the method steps are carried out by penetration testing remote computing device 208. However, the method may be equally carried out by implementing the corresponding instructions stored in the storage media 272a, 272b, and 274 of FIG. 3B.

At step 300, the remote computing device 208 determines that a first network node 202a is compromisable by an attacker during a penetration testing campaign, for example by processor 210 executing instructions 220 stored in storage medium 212. In the system of FIG. 3B, this step would be accomplished by processor 260 executing instructions 290 stored in penetration testing storage medium 274.

At step 302, the remote computing device 208 determines that during the penetration testing campaign, the first network node 202a sent a first email 214 including a first attachment 216 to a second network node 202b, for example by processor 210 executing instructions 222 stored in storage medium 212. In the system of FIG. 3B, step 302 would be accomplished by processor 256a executing instructions 282 stored in first reconnaissance agent storage medium 272a. The second network node 202b (252b) is different from the first network node 202a (252a).

Step 302 may occur before the occurrence of step 300, or after the occurrence of step 300.

At step 304, the remote computing device 208 determines that, during the penetration testing campaign, a second email containing a second attachment was received by the second network node 202b, for example by processor 210 executing instructions 224 stored in storage medium 212. In the system of FIG. 3B, step 304 would be accomplished by processor 256b executing instructions 284 stored in second reconnaissance agent storage medium 272b.

At step 306, the remote computing device 208 determines that, during the penetration testing campaign, a user of second network node 202b opened the second attachment contained in the second email, for example by processor 210 executing instructions 226 stored in storage medium 212. In the system of FIG. 3B, step 306 would be accomplished by processor 256b executing instructions 286 stored in second reconnaissance agent storage medium 272b.

At step 308, the remote computing device 208 determines that the first email and the second email are a same email, for example by processor 210 executing instructions 228 stored in storage medium 212. In the system of FIG. 3B, step 308 would be accomplished by processor 258 executing instructions 292 stored in penetration testing storage medium 274.

Determining that the first email and the second email are the same email may include determining any one or more of the following:
  a time at which the second email was received by the second network node (202b, 252b) is subsequent to a time at which the first email was sent from the first network node (202a, 252a);
  a duration that elapsed from a time at which the first email was sent from the first network node (202a, 252a) to a time at which the second email was received by the second network node (202b, 252b) does not exceed a given threshold;
  a first name of the first attachment contained in the first email is the same as a second name of the second attachment contained in the second email;
  a first title of the first email is the same as a second title of the second email;
  a first body of the first email is the same as a second body of the second email; or
  a source address field of the second email includes an address of the first network node (202a, 252a).

At step 310, based on the results of steps 300, 302, 304, 306, and 308, the remote computing device 208 concludes that the second network node 202b is compromisable by the attacker during the penetration testing campaign, for example by processor 210 executing instructions 230 stored in storage medium 212. In the system of FIG. 3B, step 310 would be accomplished by processor 258 executing instructions 294 stored in penetration testing storage medium 274.

At step 312, based on concluding that the second network node 202b is compromisable by the attacker, the remote computing device 208 determines a specific way for the attacker to compromise the networked system 200, which specific way includes a step of sending an email containing a poisoned attachment from the first network node 202a to the second network node 202b, for example by processor 210 executing instructions 232 stored in storage medium 212. In the system of FIG. 3B, step 312 would be accomplished by processor 258 executing instructions 296 stored in penetration testing storage medium 274.

At step 314, the remote computing device 208 reports the determined specific way for the attacker to compromise the networked system, for example by processor 210 executing instructions 234 stored in storage medium 212. In the system of FIG. 3B, step 314 would be accomplished by processor 258 executing instructions 298 stored in penetration testing storage medium 274. The reporting at step 314 includes at least one operation selected from the group consisting of (i) causing a display device to display a report including information about the determined specific way to compromise the networked system, (ii) recording the report including the information about the determined specific way to compromise the networked system in a file, and (iii) electronically transmitting the report including the information about the determined specific way to compromise the networked system.

In some embodiments, an additional step 316 precedes step 310. In such embodiments, at step 316 the remote computing device 208 estimates whether or not the second network node 202b would have been compromised as a result of the user thereof opening the second attachment contained in the second email if the second attachment would have been a poisoned attachment, for example by processor 210 executing instructions 299 stored in storage medium 212. In the system of FIG. 3B, step 316 would be accomplished by processor 258 executing instructions 299 stored in penetration testing storage medium 274. In embodiments which include step 316, the determination made at step 310 is further based on the estimating at step 316 providing a positive result, i.e. estimating that the second network node would have been compromised.

In some embodiments, the estimating at step 316 is based on a file type of the second attachment contained in the second email. For example, if the second attachment is of a file type that cannot contain malicious code, such as a jpeg file, then step 316 would estimate that the second network node would not be compromised. By contrast, if the second attachment is of a file type that can contain malicious code, such as a pdf file or an exe file, step 316 would estimate that the second network node would be compromised.

In some such embodiments, the estimating at step 316 may include determining a software application used by second network node 202b to open files of the file type of the second attachment. More specifically, if the application used to open files of the type of the second attachment is known to have a vulnerability that will cause it to execute malicious code in the second attachment file, step 316 would estimate that the second network node would be compromised. By contrast, if the application used to open files of the type of the second attachment is known not to have such vulnerabilities, such that even if the second attachment included malicious code, that code would not be executed, step 316 would estimate that the second network node would not be compromised.

In some embodiments, particularly when the specific software application used by the second network node 202b to open the second attachment is unknown, the estimate at step 316 may be based on determining a software application most commonly used by network nodes of the networked system for opening files having the file type of the second attachment contained in the second email. Such determination would be helpful because the analysis described in the previous paragraph could be made based on a statistical assumption that the second network node 202b would use the most commonly used software application for opening the second attachment.

In some embodiments, the estimating at step 316 is based on determining whether the second attachment is password-protected or is encrypted. For example, if the second attachment is password protected or encrypted, then step 316 would estimate that the second network node would not be compromised. Otherwise, step 316 would estimate that the second network node would be compromised.

Figure 5A:
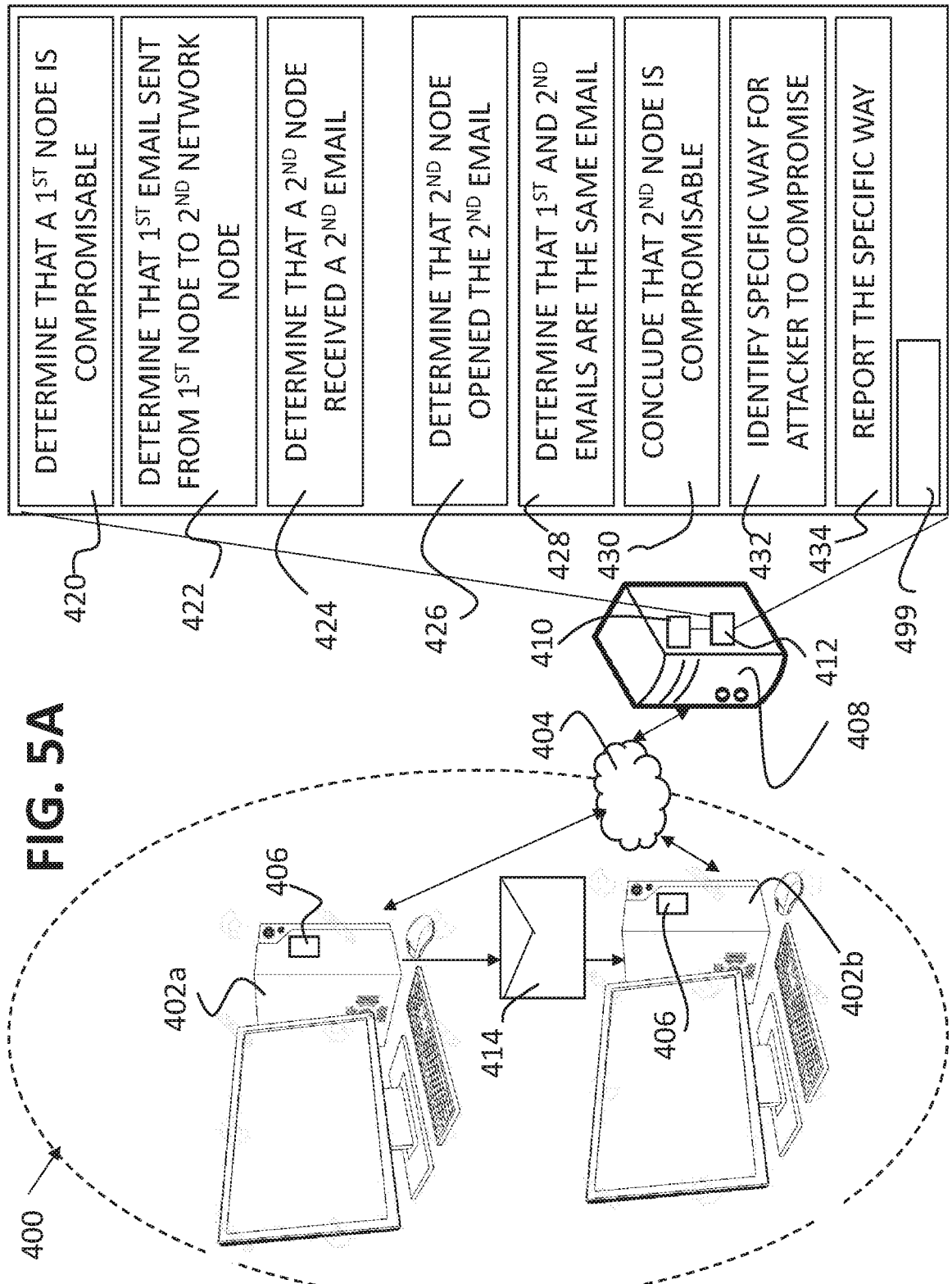
FIGS. 5A and 5B are schematic illustrations of systems for identifying a specific way for an attacker to compromise a networked system, where the specific way includes a step of poisoning a specific network node by the specific network node receiving a poisoned email body, according to second embodiments of the invention.
Figure 5B:
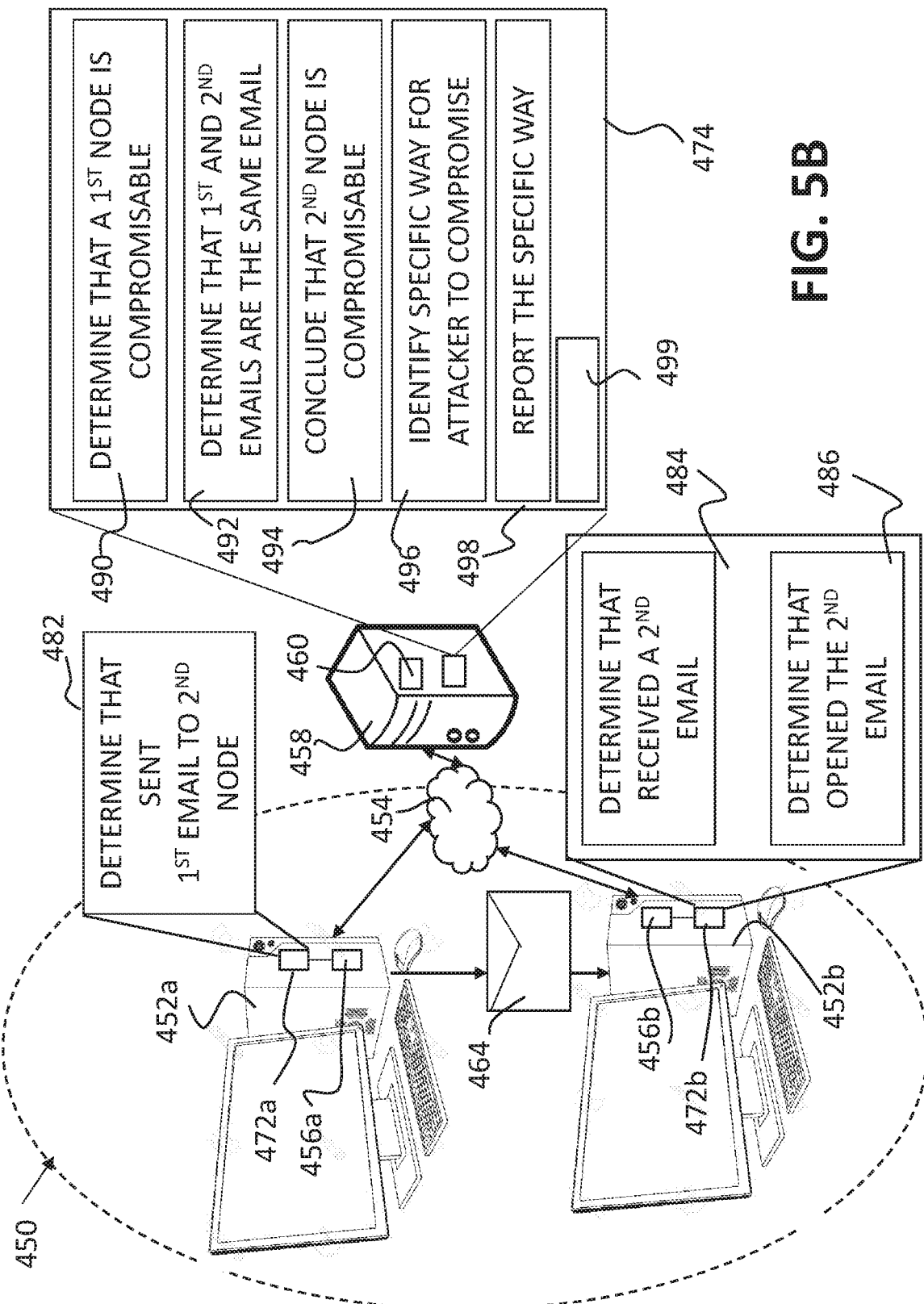

Reference is now made to FIGS. 5A and 5B, which are schematic illustrations of systems for identifying a specific way for an attacker to compromise a networked system, where the specific way includes a step of poisoning a specific network node by the specific network node receiving a poisoned email body, according to second embodiments of the invention.

As seen in FIG. 5A, the networked system 400 (indicated by a dashed oval in FIG. 5A) includes a plurality of network nodes interconnected by one or more networks. In the illustrated embodiment, a first network node 402a and a second network node 402b are interconnected by a network 404. As seen, each of network nodes 402a and 402b includes one or more processors 406, illustrated in FIG. 5A as a single processor.

Each of network nodes 402a and 402b is in electronic communication, for example via network(s) 404, with a penetration testing remote computing device 408, which forms a centralized penetration testing system for determining compromisability of networked system 400, and specifically for determining compromisability of a specific network node of the networked system by receipt of a poisoned email body. The centralized penetration testing system implemented by computing device 408 is a simulated penetration testing system.

Penetration testing remote computing device 408 includes one or more processors 410 and one or more storage media 412.

In some embodiments, the penetration testing remote computing device 408 may include a penetration-testing-campaign module, including campaign management functionality of the penetration testing system and a reporting module including a reporting functionality of the penetration testing system, substantially as described hereinabove with respect to FIG. 1A. The penetration-testing-campaign module may be associated with a penetration-testing-campaign processor forming part of processors 410, and with a penetration-testing-campaign storage medium forming part of storage media 412. Similarly, the reporting module may be associated with a reporting processor forming part of processors 410, and with a reporting storage medium forming part of storage media 412.

For the sake of brevity, the description hereinbelow relates to a single processor 210 and a single storage medium 412.

The penetration testing storage medium 412 may be a non-transitory computer readable storage medium, and includes instructions to be executed by processor(s) 410 of penetration testing remote computing device 408.

In the illustrated embodiment, it is assumed that a poisoned email 414 which has a poisoned email body including malicious computer code, may be sent from network node 402a to network node 402b, for example via network 404. As described hereinbelow, remote computing device 408 includes instructions for identifying whether, if node 402a were compromised, the email 414 would cause compromising of node 402b.

Specifically, penetration testing storage medium 412 has stored:

first instructions 420 to determine that a first network node 402a is compromisable by an attacker during a penetration testing campaign;

second instructions 422 to determine that, during the penetration testing campaign, a first email 414 was sent from the first network node 402a to a second network node 402b, the second network node being different from the first network node;

third instructions 424 to determine that, during the penetration testing campaign, a second email was received by the second network node 402b;

fourth instructions 426 to determine that, during the penetration testing campaign, a user of the second network node 402b opened the second email;

fifth instructions 428 to determine that the first email and the second email are the same email;

sixth instructions 430 to conclude that the second network node 402b is compromisable by the attacker during the penetration testing campaign, where the conclusion is based on the determinations made when executing instructions 420, 422, 424, 426, and 428; and seventh instructions 432 to determine a specific way for the attacker to compromise the networked system, where the determination is based on the conclusion reached when executing instructions 430, and specifically where the specific way for the attacker to compromise the networked system includes a step of sending a poisoned email having a poisoned email body from the first network node 402a to the second network node 402b; and eighth instructions 434 to report the specific way for the attacker to compromise the networked system, as determined when executing the instructions 432.

Eighth instructions 434 include at least one of: (i) instructions to cause a display device to display information about the specific way for the attacker to compromise the networked system, (ii) instructions to store the information about the specific way for the attacker to compromise the networked system in a file, and (iii) instructions to electronically transmit the information about the specific way for the attacker to compromise the networked system.

In some embodiments, the eighth instructions 434 are implemented in a separate module, and as such the eighth instructions may be stored in a reporting memory and may be executed by one or more reporting processors, which, in the illustrated embodiment, are considered to be part of memory 412 and processor(s) 410, respectively.

Turning to FIG. 5B, the networked system 450 (indicated by a dashed oval in FIG. 5B) includes a plurality of network nodes interconnected by one or more networks. In the illustrated embodiment, a first network node 452a and a second network node 452b are interconnected by a network 454. As seen, network node 452a includes one or more processors 456a, and network node 452b includes one or more processors 456b, both illustrated in FIG. 5B as a single processor. Each of network nodes 452a and 452b is in electronic communication, for example via network(s) 454, with a penetration testing remote computing device 458, which includes one or more processors 460, and one or more storage media 474.

In some embodiments, the penetration testing remote computing device 458 may include a penetration-testing-campaign module, including campaign management functionality of the penetration testing system and a reporting module including a reporting functionality of the penetration testing system, substantially as described hereinabove with respect to FIG. 1A. The penetration-testing-campaign module may be associated with a penetration-testing-campaign processor forming part of processors 460, and with a penetration-testing-campaign storage medium forming part of storage media 474. Similarly, the reporting module may be associated with a reporting processor forming part of processors 460, and with a reporting storage medium forming part of storage media 474.

For the sake of brevity, the description hereinbelow relates to a single processor 460 and a single storage medium 474.

The penetration testing storage medium 474 may be a non-transitory computer readable storage medium, and includes instructions to be executed by processor(s) 460 of penetration testing remote computing device 458.

In the illustrated embodiment, it is assumed that an email 464 including malicious computer code, may be sent from network node 452a to network node 452b, for example via network 454.

A distributed system for determining compromisability of a specific network node 452b of the networked system 450 by receipt of a poisoned email having a poisoned email body includes a first reconnaissance agent storage medium 472a installed on network node 452a, a second reconnaissance agent storage medium 472b installed on network node 452b, and a penetration testing storage medium 474.

Each of reconnaissance agent storage media 472a and 472b may be a non-transitory computer readable storage medium, and includes instructions to be executed by respective processor(s) 456a and 456b of the respective network node 452a and 452b on which the reconnaissance agent in installed and which is in electronic communication with remote computing device 458.

Specifically, first reconnaissance agent storage medium storage medium 472a has stored instructions 482 to determine that, during the penetration testing campaign, a first email 464 was sent from the first network node 452a to second network node 452b, the second network node being different from the first network node.

Second reconnaissance agent storage medium storage medium 472b has stored:

instructions 484 to determine that, during the penetration testing campaign, a second email was received by the second network node 452b; and instructions 486 to determine that, during the penetration testing campaign, a user of the second network node 452b opened the second email.

Penetration testing storage medium 474 has stored:

first instructions 490 to determine that the first network node 452a is compromisable by an attacker during a penetration testing campaign;

second instructions 492 to determine that the first email and the second email are the same email;

third instructions 494 to conclude that the second network node 452b is compromisable by the attacker during the penetration testing campaign, where the conclusion is based on the determinations made when executing instructions 482, 484, 486, 490, and 492;

fourth instructions 496 to determine a specific way for the attacker to compromise the networked system, where the determination is based on the conclusion reached when executing instructions 494, and specifically where the specific way for the attacker to compromise the networked system includes a step of sending a poisoned email having a poisoned email body from the first network node 452a to the second network node 452b; and fifth instructions 498 to report the specific way for the attacker to compromise the networked system, as determined when executing the instructions 496.

Fifth instructions 498 include at least one of: (i) instructions to cause a display device to display information about the specific way for the attacker to compromise the networked system, (ii) instructions to store the information about the specific way for the attacker to compromise the networked system in a file, and (iii) instructions to electronically transmit the information about the specific way for the attacker to compromise the networked system.

In some embodiments, the eighth instructions 498 are implemented in a separate module, and as such the eighth instructions may be stored in a reporting memory and may be executed by one or more reporting processors, which, in the illustrated embodiment, are considered to be part of memory 474 and processor(s) 460, respectively.

The following relates to the centralized penetration-testing system illustrated FIG. 5A, as well as to the distributed penetration-testing system illustrated in FIG. 5B.

In some embodiments, the instructions to determine that the first email was sent from the first network node (instructions 422 of FIG. 5A or instructions 482 of FIG. 5B) are executed subsequent to execution of the instructions to determine that the first network node is compromisable by the attacker (instructions 420 of FIG. 5A or instructions 490 of FIG. 5B).

In other embodiments, the instructions to determine that the first email was sent from the first network node (instructions 422 of FIG. 5A or instructions 482 of FIG. 5B) are executed prior to execution of the instructions to determine that the first network node is compromisable by the attacker (instructions 420 of FIG. 5A or instructions 490 of FIG. 5B).

In some embodiments, the instructions to determine that the first email and the second email are the same email (instructions 428 of FIG. 5A or instructions 492 of FIG. 5B) include any one of more of the following:

instructions to determine that a time at which the second email was received by the second network node (402b of FIG. 5A or 452b of FIG. 5B) is subsequent to a time at which the first email was sent from the first network node (402a of FIG. 5A or 452a of FIG. 5B);

instructions to determine that a duration that elapsed from a time at which the first email was sent from the first network node (402a of FIG. 5A or 452a of FIG. 5B) to a time at which the second email was received by the second network node (402b of FIG. 5A or 452b of FIG. 5B) does not exceed a given threshold.

instructions to determine that a first title of the first email is the same as a second title of the second email.

instructions to determine that a first body of the first email is the same as a second body of the second email.

instructions to determine that a source address field of the second email includes an address of the first network node.

In some embodiments, the penetration testing non-transitory computer readable storage medium (storage medium 412 of FIG. 5A or storage medium 474 of FIG. 5B) further has stored additional instructions 499 to estimate whether or not the second network node (402b of FIG. 5A or 452b of FIG. 5B) would have been compromised as a result of the user of the second network node opening the second email, if the body of the second email would have been poisoned. In such an embodiment, the instructions to determine that the second network node is compromisable by the attacker during the penetration testing campaign (instructions 430 of FIG. 5A or instructions 494 of FIG. 5B) are further based on a result of execution of said instructions to estimate being a positive result.

In some such embodiments, the instructions to estimate include instructions to determine an email software application used by the second network node for opening emails. In some other such embodiments, the instructions to estimate include instructions to determine an email software application most commonly used by network nodes of the networked system for opening emails.

In some embodiments, the instructions to estimate include instructions to estimate based on at least one of:

determining whether the second attachment contained in the second email is password protected; and determining whether the second attachment contained in the second email is encrypted.

In some embodiments of the distributed system of FIG. 5B, the additional instructions 499 are stored in the second reconnaissance agent storage medium 472b and are executed by second network node 452b.

Figure 6:
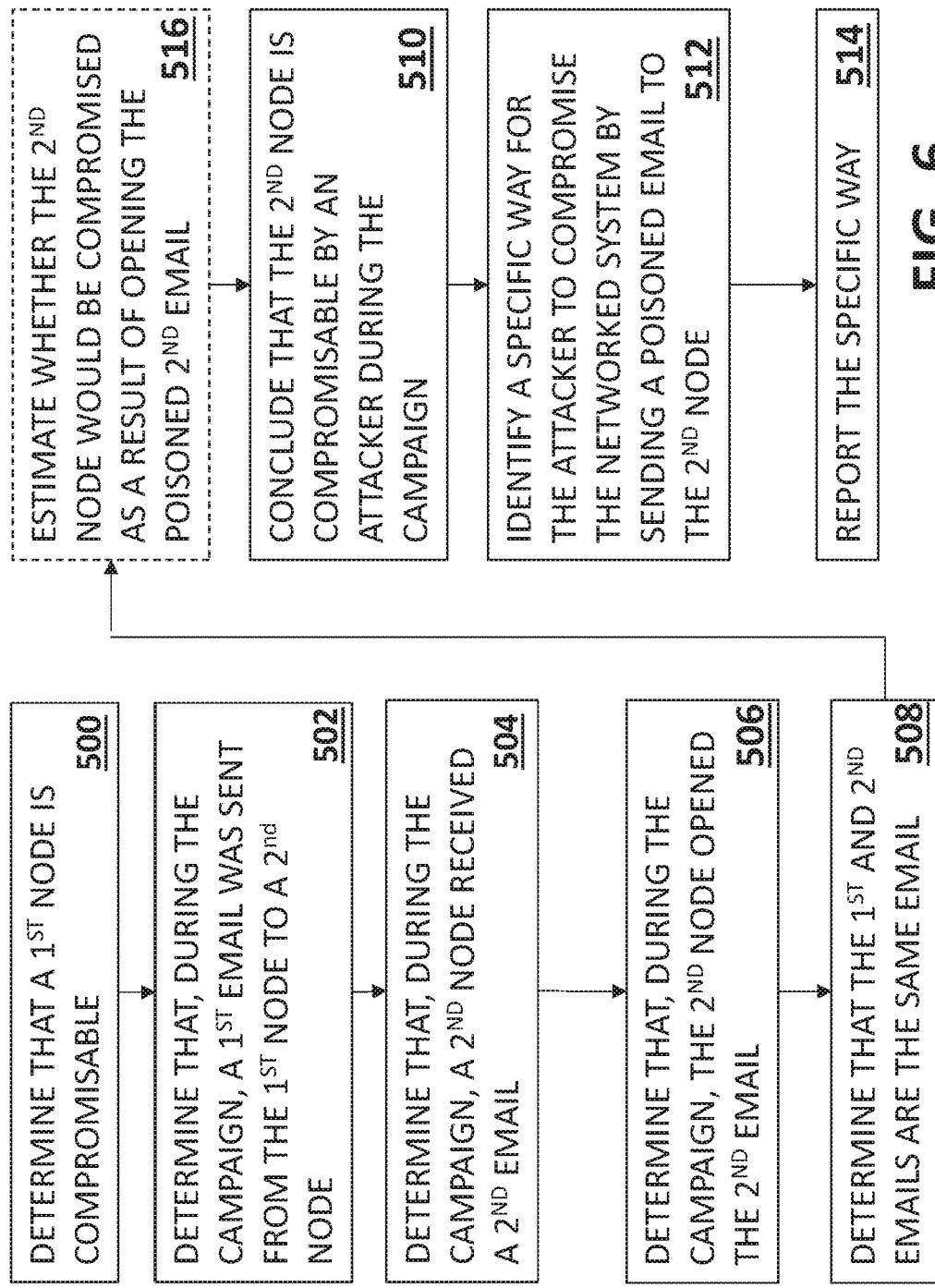
FIG. 6 is a flow chart of a method for identifying a specific way for an attacker to compromise a networked system, where the specific way includes a step of poisoning a specific network node by the specific network node receiving a poisoned email body, according to second embodiments of the invention.

Reference is now additionally made to FIG. 6, which is a flow chart for identifying a specific way for an attacker to compromise a networked system, where the specific way includes a step of poisoning a specific network node in the networked system, such as network node 402b in networked system 400 of FIG. 5A or network node 452b in networked system 450, by the specific network node receiving a poisoned email having a poisoned email body, such as email 214 or 264, according to seconds embodiment of the invention.

For brevity, the following description is mainly provided with respect to the centralized penetration testing system of FIG. 5A, such that all of the method steps are carried out by penetration testing remote computing device 408. However, the method may be equally carried out by implementing the corresponding instructions stored in the storage media 472a, 472b, and 474 of FIG. 5B.

At step 500, the remote computing device 408 determines that a first network node 402a is compromisable by an attacker during a penetration testing campaign, for example by processor 410 executing instructions 420 stored in storage medium 412. In the system of FIG. 5B, this step would be accomplished by processor 460 executing instructions 490 stored in penetration testing storage medium 474.

At step 502, the remote computing device 408 determines that during the penetration testing campaign, the first network node 402a sent a first email 414 to a second network node 402b, for example by processor 410 executing instructions 422 stored in storage medium 412. In the system of FIG. 5B, step 502 would be accomplished by processor 456a executing instructions 482 stored in first reconnaissance agent storage medium 472a. The second network node 402b (452b) is different from the first network node 402a (452a).

Step 502 may occur before the occurrence of step 500, or after the occurrence of step 500.

At step 504, the remote computing device 408 determines that, during the penetration testing campaign, a second email was received by the second network node 402b, for example by processor 410 executing instructions 424 stored in storage medium 412. In the system of FIG. 5B, step 504 would be accomplished by processor 456b executing instructions 484 stored in second reconnaissance agent storage medium 472b.

At step 506, the remote computing device 408 determines that, during the penetration testing campaign, a user of second network node 402b opened the second email, for example by processor 410 executing instructions 426 stored in storage medium 412. In the system of FIG. 5B, step 506 would be accomplished by processor 456b executing instructions 486 stored in second reconnaissance agent storage medium 472b.

At step 508, the remote computing device 408 determines that the first email and the second email are a same email, for example by processor 410 executing instructions 428 stored in storage medium 412. In the system of FIG. 5B, step 508 would be accomplished by processor 458 executing instructions 492 stored in penetration testing storage medium 474.

Determining that the first email and the second email are the same email may include determining any one or more of the following:
- a time at which the second email was received by the second network node (402b, 452b) is subsequent to a time at which the first email was sent from the first network node (402a, 452a);
- a duration that elapsed from a time at which the first email was sent from the first network node (402a, 452a) to a time at which the second email was received by the second network node (202b, 452b) does not exceed a given threshold;
- a first title of the first email is the same as a second title of the second email;
- a first body of the first email is the same as a second body of the second email; or
- a source address field of the second email includes an address of the first network node (402a, 452a).

At step 510, based on the results of steps 500, 502, 504, 506, and 408, the remote computing device 408 concludes that the second network node 402b is compromisable by the attacker during the penetration testing campaign, for example by processor 410 executing instructions 430 stored in storage medium 412. In the system of FIG. 5B, step 510 would be accomplished by processor 458 executing instructions 494 stored in penetration testing storage medium 474.

At step 512, based on concluding that the second network node 402b is compromisable by the attacker, the remote computing device 408 determines a specific way for the attacker to compromise the networked system 400, which specific way includes a step of sending a poisoned email having a poisoned email body from the first network node 402a to the second network node 402b, for example by processor 410 executing instructions 432 stored in storage medium 412. In the system of FIG. 5B, step 512 would be accomplished by processor 458 executing instructions 496 stored in penetration testing storage medium 474.

At step 514, the remote computing device 408 reports the determined specific way for the attacker to compromise the networked system, for example by processor 410 executing instructions 434 stored in storage medium 412. In the system of FIG. 5B, step 514 would be accomplished by processor 458 executing instructions 498 stored in penetration testing storage medium 474. The reporting at step 514 includes at least one operation selected from the group consisting of (i) causing a display device to display a report including information about the determined specific way to compromise the networked system, (ii) recording the report including the information about the determined specific way to compromise the networked system in a file, and (iii) electronically transmitting the report including the information about the determined specific way to compromise the networked system.

In some embodiments, an additional step 516 precedes step 510. In such embodiments, at step 516 the remote computing device 408 estimates whether or not the second network node 402b would have been compromised as a result of the user thereof opening the second email if the second email would have been poisoned, for example by processor 410 executing instructions 499 stored in storage medium 412. In the system of FIG. 5B, step 516 would be accomplished by processor 458 executing instructions 499 stored in penetration testing storage medium 474. In embodiments which include step 516, the determination made at step 510 is further based on the estimating at step 516 providing a positive result, i.e. estimating that the second network node would have been compromised.

In some embodiments, the estimating at step 516 may include determining an email software application used by second network node 402b to open emails. More specifically, if the email application is known to have a vulnerability that will cause it to execute malicious code in the second email, step 516 would estimate that the second network node would be compromised. By contrast, if the email application is known not to have such vulnerabilities, such that even if the second email included malicious code, that code would not be executed, step 516 would estimate that the second network node would not be compromised.

In some embodiments, particularly when the specific email software application used by the second network node 402b to open the second email is unknown, the estimate at step 516 may be based on determining an email software application most commonly used by network nodes of the networked system for opening emails. Such determination would be helpful because the analysis described in the previous paragraph could be made based on a statistical assumption that the second network node 402b would use the most commonly used email software application for opening the second email.

Definitions

This disclosure should be interpreted according to the definitions below. In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"— One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, allowing users to log into the network node based only on knowing user credentials without requiring a second authenticating factor, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition in the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation". Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "a penetration testing campaign" or just "a campaign"—A specific run of a specific test of a specific networked system by the penetration testing system.

An execution of a campaign ends by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

22. "attacker" or "threat actor"—An entity, whether a single person, a group of persons or an organization, that might conduct an attack against a networked system by penetrating it for uncovering its security vulnerabilities and/or for compromising it.

23. "a type of an attacker"—A classification of the attacker that indicates its main incentive in conducting attacks of networked systems. Typical values for a type of an attacker are a state-sponsored attacker, a professional cyber criminal attacker, an amateur cyber criminal attacker and an insider attacker.

24. "a state-sponsored attacker"—An attacker that has a high level of expertise in conducting cyber attacks and usually conducts his attacks on behalf of a state.

25. "a professional cyber criminal attacker"—An attacker that has a high level of expertise in conducting cyber attacks and usually conducts his attacks not on behalf of a state.

26. "an amateur cyber criminal attacker"—An attacker that has a low level of expertise in conducting cyber attacks.

27. "an insider attacker"—An attacker that is an employee or otherwise works for the organization owning the networked system being attacked.

28. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

29. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

30. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is (i) either an immediate neighbor of or reachable from the last network node that was compromised, and (ii) is not yet compromised (provided such neighbor node exists).

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource and picking the first node on this path to be the next node to try to compromise. Note that if the shortest path has a length of one (which happens when the specific node is an immediate neighbor of an already compromised node), then the next node to try to compromise is the specific node containing the desired resource.

Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also either an immediate neighbor of or reachable from an already compromised node (if such node exists). Typically, an attacker uses a single lateral movement strategy during an attack.

31. "network nodes A and B are immediate neighbors of each other"—Network nodes A and B have a direct communication link between them that does not pass through any other network node.

32. "network node A can communicate with network node B" or "network node B is reachable from network node A"—Network node A can send information (e.g. commands and/or data) to network node B. The sent information may be passed directly between the two network nodes without passing through any other network node, or it may be passed through one or more other nodes.

The communication channel between the two network nodes may be a two-way communication channel, with which each of the two network nodes can send information to the other one. Alternatively, the communication channel may be a one-way communication channel, enabling network node A to send information to network node B, but not the other way around.

33. "accessing a network node"—Communicating with the network node in a way that provides the accessing entity an ability to perform an operation on one or more resources of the network node. For example, when a user logs into a first network node from a second network node, the second network node is accessing the first network node. As another example, when a file is read by a first network node from a shared folder in a second network node, the first network node is accessing the second network node. When a first node is accessing a second node, the second node is being accessed by or from the second network node.

34. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

35. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

36. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

37. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node.

A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node.

A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

38. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node.

Another type of an attack agent may include code that when executed by a processor of a network node determines whether that network node would be compromised if a given operation is performed.

39. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.

The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

40. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

41. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

42. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

43. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

44. "a resource of a network node" or "an asset of a network node"—A file in the network node, a folder in the network node, credentials of a user residing in the network node (the credentials not necessarily applying to the network node containing the credentials), a peripheral device of the network node or a communication device accessible to the network node.

45. "a resource of a networked system" or "an asset of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

46. "a critical asset of a network node/system"—An asset of the network node/system that is considered to be important to the owner of the network node/system. The determination of the importance of the asset can be done in any desired way—it may be done manually or automatically, and it be may be based on objective or subjective considerations.

47. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

Access rights may be conditioned on the user authenticating himself before getting the rights to perform the relevant operations. A user is said to have certain access rights regardless if those rights are conditioned on authentication or not.

The term "access rights" in the plural may be used even if only a single right is involved (e.g. when a user has only a right to read a single file in the network node).

48. "user credentials"—An attestation issued to the user for authenticating himself in order to be allowed to use access rights granted to him in one or more network nodes. User credentials may include a user name, a user ID, a password, any combination of the three, or any other data item which is expected not to be available to other people.

49. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node.

50. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

51. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

52. "administrator of a network node"—Any person that is authorized, among other things, to define or change at least one rule controlling at least one of an access right, a permission, a priority and a configuration in the network node.

53. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

54. "achieving full control of a computing device"—For a multi-user computing device that distinguishes between administrator and non-administrator users, logging into the computing device with administrator access rights. For a single-user computing device, logging into the computing device as the single user.

55. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

56. "termination condition of a campaign", "terminating condition of a campaign", "halting condition of a campaign", "stopping condition of a campaign", "termination criterion of a campaign", "terminating criterion of a campaign", "halting criterion of a campaign", or "stopping criterion of a campaign"—A Boolean condition defined for the campaign that if and when satisfied causes the halting of the campaign, even if the goal of the attacker of the campaign was not yet reached.

For the sake of the above defined terms the singular and plural forms are equivalent—"criterion" and "criteria" are used interchangeably, and so are "condition" and "conditions".

The condition may be a simple condition (for example "the number of already compromised nodes in the tested networked system is five or more") or a compound condition composed of multiple simple conditions and one or more logical operators (for example "a file named company_budget.xls is exported out of the tested networked system from any network node, or at least ten files were encrypted by the attacker in the network node used by the organization's CFO").

A halting condition of a campaign can be defined for all types of penetration testing systems. For an actual attack penetration testing system, the halting condition is typically associated with the state or status of the tested networked system. For penetration testing systems that do not attempt to compromise the tested networked system, the halting condition is typically associated with a state or status of a simulation of the networked system or may be evaluated based on such state or status. However, the above is not limiting in any way, and the halting condition may depend on any factor that is available to the penetration testing system during the campaign, including on factors that are independent of the state and the status of the campaign, for example on the amount of time spent on running the campaign or on the time of day.

57. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

58. "damaging a network node"—Carrying out an operation related to the network node that is not allowed by the owner of the network node and that causes a change of state in the network node or in some resource related to the network node.

Examples of operations damaging a network node are: (i) damaging a file residing in the network node, (ii) exporting a file (or a portion of it) residing in the network node out of the network node, (iii) shutting down the network node, (iv) shutting down or disabling a service provided by the network node, or (v) closing or disabling a software application executing in the network node.

59. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

60. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

61. "a defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one countermeasure.

62. "selecting a link"—Making an operation by a user that causes following the link to a destination pointed to by the link. Typically, selecting a link is achieved by pointing a visible cursor to the link and clicking a button on a pointing device (e.g. a mouse) or by touching the location of the link on a touch screen. However, there are other ways of selecting a link, for example by moving a selection indicator until the link is marked as selected and then hitting a selection button (e.g. an "Enter" button in a keyboard or an "OK" button in a remote-control device).

63. "executable file"—A computer file that contains instructions that may be executed by a computer. An executable file may be a binary file (e.g. when containing machine code) or a text file (e.g. when containing interpreted scripting code).

64. "text file"—A computer file that includes mostly text. A text file may include some non-textual content. For example, Microsoft Word files may include some non-textual control characters or metadata but are still considered text files.

65. "binary file"—Any computer file that is not a text file. A binary file may include some textual content. For example, executable files containing machine code may include textual strings that are part of the executable code but are still considered binary files.

66. "opening a file"—If the file is an executable file, then opening it means executing it. If the file is not an executable file, then opening it means creating by the operating system at least one data structure associated with the file, the one or more data structures used for enabling a software application to read or write data from/to the file.

67. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

68. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

69. "random selection"—A selection that depends on a random or pseudo-random factor. Different possible outcomes in a random selection do not necessarily have the same probabilities of being selected.

70. "broadcast domain"—A logical division of a networked system, in which all network nodes can reach each other by broadcasting at the data link layer. In other words, each network node in a broadcast domain can transmit a data link broadcast message that is addressed to all other network nodes within its broadcast domain.

71. "data packet", "network packet" or "network message"—A formatted unit of data carried by a computer network.

72. "data packet of a network node"—A data packet that is either sent by the network node or received by the network node.

73. "remediation action" or just "remediation"—An action that improves the security of a networked system by making one or more attacker steps practically unavailable, more expensive, more difficult, less efficient and/or less useful for attackers of the networked system.

An example of a remediation action that makes only a single attacker step practically unavailable to attackers is the installing of a defensive measure applicable only to a single network node (e.g. installing in a single network node a software utility that locally requires fingerprints identification on top of requiring a password in order to allow access). An example of a remediation action that makes multiple attacker steps practically unavailable to attackers is the replacing of a common algorithm or a common method used in multiple network nodes of the networked system by an improved algorithm or method (e.g. the global replacing of a simple password hash code calculation algorithm by an improved password hash code algorithm that uses salt in its calculation). In such case, each given network node benefiting from the improved algorithm corresponds to a different attacker step targeting the given network node.

A remediation action that makes the one or more attacker steps practically unavailable does not necessarily make the one or more attacker steps completely unavailable to the attackers. If an action makes the one or more attacker steps too costly for the attackers to use (i.e. makes the cost of exploitation of the one or more attacker steps so high that there is very low probability that the attackers would use them), then the action is considered to make the one or more attacker steps practically unavailable to the attackers and therefore is a remediation action.

Another example of a remediation action that does not make the one or more attacker steps completely unavailable to the attackers is an action of replacing an encryption algorithm using a short key with a similar encryption algorithm using a longer key. This may result in the deciphering of the encrypted data by an attacker taking a much longer time than before. This in turn makes the one or more attacker steps less efficient to use, and therefore such action is considered to be a remediation action.

74. "email message" or "e-mail message" (or just "email" or "e-mail" for short)—A message sent from a computing device to one or more other computing devices via a networked computing system (e.g. the Internet) using a mail protocol.

75. "title of an email" or "email title"—Text that in included in a dedicated field of the email message and is typically displayed by a receiving computing device above the rest of the content of the email message. Providing a title in an email enables the sender of the email to provide a short description or summary of what the email is about, if he desires to do so.

76. "body of an email" or "email body"—The text included in the email message that provides its content, excluding text included in the title of the email and excluding text included in attachments to the email.

77. "email attachment", "attachment file" or "attachment"—a computer file sent along with an email message. An attachment file can be of any file type and is not limited to be a text file. One or more attachments can be attached to the same email message. Attachments are typically used for sharing documents and images.

78. "poisoned file"—A file containing malicious computer code and having the property that opening the file in a computing device may result in automatically executing the malicious code in the computing device, thereby causing compromising of the computing device.

The automatic executing of malicious computer code when opening a poisoned file in a computing device may depend on the software application used by the computing device for opening the poisoned file. It is possible that opening the file with a first software application will cause compromising of the computing device, while opening the file with a second software application will not result in compromising the computing device. A file containing malicious computer code whose file type is supported by multiple software applications, some causing compromising and some not, is a poisoned file in spite of the fact that poisoning of the computing device in which it is opened is not guaranteed, as long as there exists (somewhere in the world) at least one software application that supports the file type and whose use for opening the file results in compromising the computing device in which it is opened.
79. "poisoned attachment file" or "poisoned attachment"—An attachment file that is a poisoned file.
80. "poisoned email body"—An email body containing malicious computer code and having the property that opening the email in a computing device using an email software application may result in automatically executing the malicious code in the computing device, thereby causing compromising of the computing device.

The automatic executing of malicious computer code when opening a poisoned email body in a computing device may depend on the email software application used by the computing device for opening the email. It is possible that opening the email with a first email software application will cause compromising of the computing device, while opening the email with a second email software application will not result in compromising the computing device. An email body containing malicious computer code which may be opened by multiple email software applications, some causing compromising and some not, is a poisoned email body in spite of the fact that poisoning of the computing device in which the email is opened is not guaranteed, as long as there exists (somewhere in the world) at least one email software application whose use for opening the email results in compromising the computing device in which it is opened.

81. "poisoned email"—An email including at least one of a poisoned email body and a poisoned attachment file.
82. "a Boolean condition"—A statement that can have a value of either true or false. If the statement is true, we say that the Boolean condition is satisfied. If the statement is false, we say that the Boolean condition is not satisfied.
83. "a software application most commonly used by network nodes of a given networked system for opening files of a given file type"—A software application which: (i) is able to open files of the given file type, and (ii) for any other software application which is also able to open files of the given file type, the number of network nodes of the given networked system in which the software application is the default application used for opening files of the given file type is not lower than the number of network nodes of the given networked system in which the other software application is the default application used for opening files of the given file type.

For example, if there are three software applications able to open files of the given file type, application A being the default application in 40% of the network nodes of the given networked system, application B being the default application in 35% of the network nodes of the given networked system, and application C being the default application in 25% of the network nodes of the given networked system, then application A is most commonly used by network nodes of the given networked system for opening files of the given file type, even though it is not used by a majority of the network nodes.

As another example, if there are three software applications able to open files of the given file type, application A being the default application in 40% of the network nodes of the given networked system, application B being the default application in 40% of the network nodes of the given networked system, and application C being the default application in 20% of the network nodes of the given networked system, then both application A and application B are most commonly used by network nodes of the given networked system for opening files of the given file type.

84. "a subset/subgroup of a given set/group" or "a sub-set/sub-group of a given set/group"—A set/group that satisfies the condition that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.
85. "a proper subset/subgroup of a given set/group" or "a proper sub-set/sub-group of a given set/group"—A subset/subgroup of the given set/group that is not equal to the given set/group. In other words, there is at least one member of the given set/group that is not a member of the subset/subgroup.
86. "a sequence"—An ordered non-empty group of items.
87. "a subsequence of a given sequence" or "a sub-sequence of a given sequence"—A sequence that satisfies the conditions that: (i) every member of it is also a member of the given sequence, and (ii) every pair of members of it are in the same order in it as they are in the given sequence. Unless explicitly stated otherwise, a subsequence may not be empty and must contain at least one member. Unless explicitly stated otherwise, a subsequence of a given sequence may contain all the members of the given sequence and be equal to the given sequence.
88. "a proper subsequence of a given sequence" or "a proper sub-sequence of a given sequence"—A subsequence of the given sequence that is not equal to the given sequence. In other words, there is at least one member of the given sequence that is not a member of the subsequence.
89. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.
90. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C but not a combination of two or three members of the group consisting of one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately, in any other embodiment, or in any suitable combination including only a sub-group of those features.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for carrying out, by a penetration testing system, a penetration testing campaign of a networked system including a plurality of network nodes, the method comprising:
   a. determining that a first network node of the plurality of network nodes is compromisable by an attacker during the penetration testing campaign;
   b. determining, by the penetration testing system, that during the penetration testing campaign, a first email containing a first attachment was sent from the first network node to a second network node of the plurality of network nodes, the second network node being different from the first network node;
   c. determining, by the penetration testing system, that during the penetration testing campaign, a second email containing a second attachment was received by the second network node;
   d. determining, by the penetration testing system, that during the penetration testing campaign, a user of the second network node opened the second attachment contained in the second email;
   e. determining, by the penetration testing system, that the first email and the second email are the same email;
   f. based on the determinations in steps (a), (b), (c), (d), and (e), concluding, by the penetration testing system, that the second network node is compromisable by the attacker during the penetration testing campaign;
   g. based on the concluding that the second network node is compromisable by the attacker, determining, by the penetration testing system, a specific way for the attacker to compromise the networked system, the specific way for the attacker to compromise the networked system including a step of sending an email containing a poisoned attachment from the first network node to the second network node; and
   h. reporting the determined specific way for the attacker to compromise the networked system, the reporting comprising at least one operation selected from the group consisting of (i) causing a display device to display a report including information about the determined specific way to compromise the networked system, (ii) recording the report including the information about the determined specific way to compromise the networked system in a file, and (iii) electronically transmitting the report including the information about the determined specific way to compromise the networked system.

2. The method of claim 1, wherein:
   i. the penetration testing system comprises (A) a penetration testing software module installed on a remote computing device, and (B) a reconnaissance agent software module installed on at least the first network node and the second network node;
   ii. the determining that the first email containing the first attachment was sent from the first network node is carried out by executing code of the reconnaissance agent software module installed on the first network node;
   iii. the determining that the second email containing the second attachment was received by the second network node is carried out by executing code of the reconnaissance agent software module installed on the second network node;
   iv. the determining that the user of the second network node opened the second attachment contained in the second email is carried out by executing code of the reconnaissance agent software module installed on the second network node; and
   v. the determining of the specific way for the attacker to compromise the networked system is carried out, at least in part, by executing code of the penetration testing software module installed on the remote computing device.

3. The method of claim 1, wherein the determining that the first email and the second email are the same email includes determining that a time at which the second email was received by the second network node is subsequent to a time at which the first email was sent from the first network node.

4. The method of claim 1, wherein the determining that the first email and the second email are the same email includes determining that a duration that elapsed from a time at which the first email was sent from the first network node to a time at which the second email was received by the second network node does not exceed a given threshold.

5. The method of claim 1, wherein the determining that the first email and the second email are the same email includes determining that a first name of the first attachment contained in the first email is the same as a second name of the second attachment contained in the second email.

6. The method of claim 1, wherein the determining that the first email and the second email are the same email includes determining that a first title of the first email is the same as a second title of the second email.

7. The method of claim 1, wherein the determining that the first email and the second email are the same email includes determining that a first body of the first email is the same as a second body of the second email.

8. The method of claim 1, wherein the determining that the first email and the second email are the same email includes determining that a source address field of the second email includes an address of the first network node.

9. The method of claim 1, further comprising: estimating, by the penetration testing system, whether or not the second network node would have been compromised as a result of the user of the second network node opening the second attachment contained in the second email if the second attachment would have been a poisoned attachment, wherein the determining that the second network node is compromisable by the attacker during the penetration testing campaign is further based on the estimating providing a positive result.

10. The method of claim 9, wherein the estimating is based on a file type of the second attachment contained in the second email.

11. The method of claim 9, wherein the estimating is based on determining whether the second attachment contained in the second email is password protected.

12. The method of claim 9, wherein the estimating is based on determining whether the second attachment contained in the second email is encrypted.

13. A system for carrying out a penetration testing campaign of a networked system including a plurality of network nodes, the system comprising:
 a. a penetration-testing-campaign module comprising:
  i. one or more penetration-testing campaign processors; and
  ii. a penetration-testing-campaign non-transitory computer readable storage medium for instructions execution by the one or more penetration-testing-campaign processors, the penetration-testing-campaign non-transitory computer readable storage medium having stored:
   1. first instructions to determine that a first network node of the plurality of network nodes is compromisable by an attacker during the penetration testing campaign;
   2. second instructions to determine that during the penetration testing campaign, a first email containing a first attachment was sent from the first network node to a second network node of the plurality of network nodes, the second network node being different from the first network node;
   3. third instructions to determine that during the penetration testing campaign, a second email containing a second attachment was received by the second network node;
   4. fourth instructions to determine that during the penetration testing campaign, a user of the second network node opened the second attachment contained in the second email;
   5. fifth instructions to determine that the first email and the second email are the same email;
   6. sixth instructions to conclude, based on the determinations made when executing the first, second, third, fourth, and fifth instructions, that the second network node is compromisable by the attacker during the penetration testing campaign; and
   7. seventh instructions to determine, based on the conclusion that the second network node is compromisable by the attacker, the conclusion made when executing the sixth instructions, a specific way for the attacker to compromise the networked system, the specific way for the attacker to compromise the networked system including a step of sending an email containing a poisoned attachment from the first network node to the second network node; and
 b. a reporting module including:
  i. one or more reporting processors; and
  ii. a reporting non-transitory computer readable storage medium for instructions execution by the one or more reporting processors, the reporting non-transitory computer readable storage medium having stored instructions to report the determined specific way for the attacker to compromise the networked system, the instructions to report including at least one set of instructions selected from the group consisting of (i) instructions to cause a display device to display a report including information about the determined specific way to compromise the networked system, (ii) instructions to record the report including the information about the determined specific way to compromise the networked system in a file, and (iii) instructions to electronically transmit the report including the information about the determined specific way to compromise the networked system.

14. A system for carrying out a penetration testing campaign of a networked system, the networked system including at least a first network node including one or more first processors and a second network node including one or more second processors, said first and second network nodes connected by one or more networks and being in communication with a remote computing device, the remote computing device including one or more processors, the system comprising:
 a. a first reconnaissance agent non-transitory computer readable storage medium for instructions execution by the one or more first processors, the first reconnaissance agent non-transitory computer readable storage medium having stored:
  i. instructions to determine that during the penetration testing campaign, a first email containing a first attachment was sent from the first network node to the second network node;
 b. a second reconnaissance agent non-transitory computer readable storage medium for instructions execution by the one or more second processors, the second reconnaissance agent non-transitory computer readable storage medium having stored:
  i. instructions to determine that during the penetration testing campaign, a second email containing a second attachment was received by the second network node;

ii. instructions to determine that during the penetration testing campaign, a user of the second network node opened the second attachment contained in the second email;

c. a penetration-testing-campaign non-transitory computer readable storage medium for instructions execution by the one or more processors of the remote computing device, the penetration-testing-campaign non-transitory computer readable storage medium having stored:

i. first instructions to determine that the first network node is compromisable by an attacker during the penetration testing campaign;

ii. second instructions to determine that the first email and the second email are the same email;

iii. third instructions to conclude, based on the determinations made when executing the first and second instructions and based on results of execution of the instructions stored in the first and second reconnaissance agent non-transitory computer readable storage media, that the second network node is compromisable by the attacker during the penetration testing campaign;

iv. fourth instructions to determine, based on the conclusion that the second network node is compromisable by the attacker, the conclusion made when executing the third instructions, a specific way for the attacker to compromise the networked system, the specific way for the attacker to compromise the networked system including a step of sending an email containing a poisoned attachment from the first network node to the second network node; and v. fifth instructions to report the determined specific way for the attacker to compromise the networked system, the instructions to report including at least one set of instructions selected from the group consisting of (i) instructions to cause a display device to display a report including information about the determined specific way to compromise the networked system, (ii) instructions to record the report including the information about the determined specific way to compromise the networked system in a file, and (iii) instructions to electronically transmit the report including the information about the determined specific way to compromise the networked system.

15. A method for carrying out, by a penetration testing system, a penetration testing campaign of a networked system including a plurality of network nodes, the method comprising:

a. determining that a first network node of the plurality of network nodes is compromisable by an attacker during the penetration testing campaign;

b. determining, by the penetration testing system, that during the penetration testing campaign, a first email was sent from the first network node to a second network node of the plurality of network nodes, the second network node being different from the first network node;

c. determining, by the penetration testing system, that during the penetration testing campaign, a second email was received by the second network node;

d. determining, by the penetration testing system, that during the penetration testing campaign, a user of the second network node opened the second email;

e. determining, by the penetration testing system, that the first email and the second email are the same email;

f. based on the determinations in steps (a), (b), (c), (d), and (e), concluding, by the penetration testing system, that the second network node is compromisable by the attacker during the penetration testing campaign;

g. based on the concluding that the second network node is compromisable by the attacker, determining, by the penetration testing system, a specific way for the attacker to compromise the networked system, the specific way for the attacker to compromise the networked system including a step of sending a poisoned email including a poisoned email body from the first network node to the second network node; and h. reporting the determined specific way for the attacker to compromise the networked system, the reporting comprising at least one operation selected from the group consisting of (i) causing a display device to display a report including information about the determined specific way to compromise the networked system, (ii) recording the report including the information about the determined specific way to compromise the networked system in a file, and (iii) electronically transmitting the report including the information about the determined specific way to compromise the networked system.

16. The method of claim 15, wherein:

i. the penetration testing system comprises (A) a penetration testing software module installed on a remote computing device, and (B) a reconnaissance agent software module installed on at least the first network node and the second network node;

ii. the determining that the first email was sent from the first network node is carried out by executing code of the reconnaissance agent software module installed on the first network node;

iii. the determining that the second email was received by the second network node is carried out by executing code of the reconnaissance agent software module installed on the second network node;

iv. the determining that the user of the second network node opened the second email is carried out by executing code of the reconnaissance agent software module installed on the second network node; and v. the determining of the specific way for the attacker to compromise the networked system is carried out, at least in part, by executing code of the penetration testing software module installed on the remote computing device.

17. The method of claim 15, wherein the determining that the first email and the second email are the same email includes determining that a time at which the second email was received by the second network node is subsequent to a time at which the first email was sent from the first network node.

18. The method of claim 15, wherein the determining that the first email and the second email are the same email includes determining that a duration that elapsed from a time at which the first email was sent from the first network node to a time at which the second email was received by the second network node does not exceed a given threshold.

19. The method of claim 15, wherein the determining that the first email and the second email are the same email includes determining that a source address field of the second email includes an address of the first network node.

20. The method of claim 15, further comprising: estimating, by the penetration testing system, whether or not the second network node would have been compromised as a result of the user of the second network node opening the second email if a body of the second email would have been poisoned, wherein the determining that the second network node is compromisable by the attacker during the penetration testing campaign is further based on the estimating providing a positive result.

\* \* \* \* \*